US011922869B2

(12) United States Patent
Bang et al.

(10) Patent No.: US 11,922,869 B2
(45) Date of Patent: Mar. 5, 2024

(54) DISPLAY DEVICE

(71) Applicant: SAMSUNG DISPLAY CO., LTD., Yongin-si (KR)

(72) Inventors: Sunghoon Bang, Seoul (KR); Seokgyu Ban, Suwon-si (KR); Dong-Ki Eun, Suwon-si (KR); Seungho Park, Suwon-si (KR); Wook Lee, Hwaseong-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 17/983,462

(22) Filed: Nov. 9, 2022

(65) Prior Publication Data

US 2023/0162670 A1 May 25, 2023

(30) Foreign Application Priority Data

Nov. 19, 2021 (KR) ........................ 10-2021-0160527

(51) Int. Cl.
*G09G 3/3225* (2016.01)

(52) U.S. Cl.
CPC ... *G09G 3/3225* (2013.01); *G09G 2300/0842* (2013.01); *G09G 2300/0852* (2013.01); *G09G 2310/061* (2013.01); *G09G 2320/0257* (2013.01); *G09G 2320/0271* (2013.01); *G09G 2320/041* (2013.01)

(58) Field of Classification Search
CPC ......... G09G 3/3225; G09G 2300/0842; G09G 2300/0852; G09G 2310/061; G09G 2320/0257; G09G 2320/0271; G09G 2320/041
See application file for complete search history.

(56) References Cited

U.S. PATENT DOCUMENTS

2006/0153444 A1* 7/2006 Trimeche .................. G06T 5/40
382/167
2016/0027412 A1* 1/2016 Igawa .................. G09G 3/3648
345/99

(Continued)

FOREIGN PATENT DOCUMENTS

KR 10-2017-0087559 7/2017

*Primary Examiner* — Nitin Patel
*Assistant Examiner* — Saifeldin E Elnafia
(74) *Attorney, Agent, or Firm* — F. Chau & Associates, LLC

(57) ABSTRACT

A display device including: a display panel including a plurality of pixels; a display panel driver configured to drive the display panel; a memory device configured to store a reference current-temperature model that is set for the display panel, a global offset of the display panel, which is calculated based on the reference current-temperature model in a manufacturing stage of the display panel, and a local offset of the display panel, which is calculated based on a characteristic difference between the pixels in the manufacturing stage; and a panel temperature determiner configured to measure sensing currents flowing through the pixels when a temperature sensing voltage is applied to the pixels, calculate correction sensing currents by applying the global offset and the local offset to the sensing currents, and determine temperatures of the pixels by substituting the correction sensing currents into the reference current-temperature model.

17 Claims, 16 Drawing Sheets

(56) References Cited

U.S. PATENT DOCUMENTS

| | | | | |
|---|---|---|---|---|
| 2017/0132977 | A1* | 5/2017 | Kim | G09G 3/3291 |
| 2017/0372658 | A1* | 12/2017 | Tamura | G09G 3/3283 |
| 2018/0286349 | A1* | 10/2018 | Mohammadi | G09G 5/04 |
| 2018/0366061 | A1* | 12/2018 | Furukawa | G09G 3/20 |
| 2022/0028327 | A1* | 1/2022 | Bae | G09G 3/3225 |
| 2022/0036812 | A1* | 2/2022 | Noh | G09G 3/3233 |

* cited by examiner

DISPLAY DEVICE

CROSS-REFERENCE TO RELATED APPLICATION

This application claims priority under 35 U.S.C. § 119 to Korean Patent Application No. 10-2021-0160527 filed on Nov. 19, 2021 in the Korean Intellectual Property Office (KIPO), the disclosure of which is incorporated by reference herein in its entirety.

1. Technical Field

Example embodiments of the present disclosure relate generally to a display device. More particularly, example embodiments of the present disclosure relate to a display device capable of measuring a temperature of a display panel.

2. Description of the Related Art

In general, when current flows through pixels included in a display panel as a display device performs a display operation, a temperature of each of the pixels may increase. Such a temperature increase may change the characteristics of each of the pixels, which eventually results in an afterimage on the display panel. To prevent afterimages due to temperature increases in the pixels, the display device may perform a technique of temperature afterimage compensation by compensating for image data that is to be applied to the pixels (or pixel blocks) according to the temperature of each of the pixels (or an average temperature of each of the pixel blocks). However, to perform the temperature afterimage compensation, the display device has to accurately identify the temperature of each of the pixels (or the average temperature of each of the pixel blocks).

To accomplish this, a conventional display device may include a temperature sensor mounted on a rear surface of a display panel to measure temperatures of all pixels (or average temperatures of all pixel blocks) or measure temperatures of some pixels (or average temperatures of some pixel blocks), and predict temperatures of the remaining pixels (or average temperatures of the remaining pixel blocks) through interpolation. However, since this display device includes the temperature sensor on the rear surface of the display panel, a manufacturing cost of the display device may be increased, and there may be a limitation as to how small the display device can be made.

Another conventional display device may employ a technique of accumulating image data applied to each of pixels (or each of pixel blocks) while a display operation is performed, and predicting a temperature of each of the pixels (or an average temperature of each of the pixel blocks) based on the accumulated image data. However, since the technique does not reflect a characteristic deviation between display panels (e.g., the same products), a characteristic deviation between pixels within the display panel, and an external environment temperature at which the display panel operates, the temperature of each of the pixels (or the average temperature of each of the pixel blocks) may not be accurately identified.

SUMMARY

Example embodiments of the present disclosure provide a display device that does not include a temperature sensor so that it can be manufactured at a low cost and in a small size. In addition, the display device reflects all of a characteristic deviation between display panels, a characteristic deviation between pixels within the display panel, and an external environment temperature at which the display panel operates to accurately identify temperatures of the pixels, thereby enabling temperature afterimage compensation to be accurately performed on image data that is to be applied to the pixels.

Example embodiments of the present disclosure also provide a display device that does not include a temperature sensor so that it can be manufactured at a low cost and in a small size. In addition, the display device reflects all of a characteristic deviation between display panels, a characteristic deviation between pixels within the display panel, and an external environment temperature at which the display panel operates to accurately identify temperatures of pixel blocks, thereby enabling temperature afterimage compensation to be accurately performed on image data that is to be applied to the pixel blocks.

According to example embodiments of the present disclosure, there is provided a display device including: a display panel including a plurality of pixels; a display panel driver configured to drive the display panel; a memory device configured to store a reference current-temperature model that is set for the display panel, a global offset of the display panel, which is calculated based on the reference current-temperature model in a manufacturing stage of the display panel, and a local offset of the display panel, which is calculated based on a characteristic difference between the pixels in the manufacturing stage; and a panel temperature determiner configured to measure sensing currents flowing through the pixels when a temperature sensing voltage is applied to the pixels, calculate correction sensing currents by applying the global offset and the local offset to the sensing currents, and determine temperatures of the pixels by substituting the correction sensing currents into the reference current-temperature model.

The display device may further include a temperature afterimage compensator configured to perform temperature afterimage compensation on image data that is to be applied to the pixels based on the temperatures of the pixels.

In the manufacturing stage, an average temperature of the display panel is measured by a temperature sensing device.

In the manufacturing stage, initial sensing currents flowing through the pixels when the temperature sensing voltage is applied to the pixels are measured, an average of the initial sensing currents is calculated, and a difference between a current mapped to the average temperature in the reference current-temperature model and the average of the initial sensing currents is determined as the global offset.

In the manufacturing stage, initial sensing currents flowing through the pixels when the temperature sensing voltage is applied to the pixels are measured, an average of the initial sensing currents is calculated, and a difference between each of the initial sensing currents and the average of the initial sensing currents is determined as the local offset.

A frame in which the display panel operates includes an active period and a vertical blank period, and the panel temperature determiner performs a sensing current measurement operation of measuring the sensing currents during the vertical blank period.

The panel temperature determiner performs the sensing current measurement operation for one pixel row during the vertical blank period.

The panel temperature determiner does not perform the sensing current measurement operation during the vertical blank period in a preset low gray level frame.

The panel temperature determiner determines the frame as the preset low gray level frame when a maximum gray level of image data of the frame is less than a reference gray level, determines the frame as the preset low gray level frame when a minimum gray level of the image data of the frame is less than the reference gray level, or determines the frame as the preset low gray level frame when an average gray level of the image data of the frame is less than the reference gray level.

The panel temperature determiner performs a panel temperature determination operation of determining the temperatures of the pixels after the sensing current measurement operation for all of the pixels is completed.

According to example embodiments of the present disclosure, there is provided a display device including: a display panel including a plurality of pixels, which are grouped into pixel blocks; a display panel driver configured to drive the display panel; a memory device configured to store a reference current-temperature model that is set for the display panel, a global offset of the display panel, which is calculated based on the reference current-temperature model in a manufacturing stage of the display panel, and a local offset of the display panel, which is calculated based on a characteristic difference between the pixel blocks in the manufacturing stage; and a panel temperature determiner configured to measure sensing currents flowing through the pixels when a temperature sensing voltage is applied to the pixels, calculate sensing current averages of the pixel blocks, calculate correction sensing current averages by applying the global offset and the local offset to the sensing current averages, and determine temperatures of the pixel blocks by substituting the correction sensing current averages into the reference current-temperature model.

The display device may further include a temperature afterimage compensator configured to perform temperature afterimage compensation on image data that is to be applied to the pixel blocks based on the temperatures of the pixel blocks.

In the manufacturing stage, an average temperature of the display panel is measured by a temperature sensing device.

In the manufacturing stage, initial sensing currents flowing through the pixels when the temperature sensing voltage is applied to the pixels are measured, an average of the initial sensing currents is calculated, and a difference between a current mapped to the average temperature in the reference current-temperature model and the average of the initial sensing currents is determined as the global offset.

In the manufacturing stage, initial sensing currents flowing through the pixels when the temperature sensing voltage is applied to the pixels are measured, an average of the initial sensing currents is calculated, initial sensing current averages of the pixel blocks are calculated, and a difference between each of the initial sensing current averages of the pixel blocks and the average of the initial sensing currents is determined as the local offset.

A frame in which the display panel operates includes an active period and a vertical blank period, and the panel temperature determiner performs a sensing current measurement operation of measuring the sensing currents during the vertical blank period.

The panel temperature determiner performs the sensing current measurement operation for one pixel row during the vertical blank period.

The panel temperature determiner does not perform the sensing current measurement operation during the vertical blank period in a preset low gray level frame.

The panel temperature determiner determines the frame as the preset low gray level frame when a maximum gray level of image data of the frame is less than a reference gray level, determines the frame as the preset low gray level frame when a minimum gray level of the image data of the frame is less than the reference gray level, or determines the frame as the preset low gray level frame when an average gray level of the image data of the frame is less than the reference gray level.

The panel temperature determiner performs a panel temperature determination operation of determining the temperatures of the pixel blocks after the sensing current measurement operation for all of the pixels is completed.

According to example embodiments of the present disclosure, there is provided a display device including: a display panel including a plurality of pixels; a display panel driver configured to drive the display panel; a memory device configured to store a reference current-temperature model that is set for the display panel, a global offset of the display panel, which is calculated based on the reference current-temperature model, and a local offset of the display panel, which is calculated based on a characteristic difference between the pixels; and a panel temperature determiner configured to measure sensing currents flowing through the pixels when a temperature sensing voltage is applied to the pixels, calculate correction sensing currents by applying the global offset and the local offset to the sensing currents, and determine temperatures of the pixels by adjusting the reference current-temperature model with the correction sensing currents.

BRIEF DESCRIPTION OF THE DRAWINGS

Illustrative, non-limiting example embodiments of the present disclosure will be more clearly understood from the following detailed description taken in conjunction with the accompanying drawings.

DETAILED DESCRIPTION OF THE EMBODIMENTS

Hereinafter, example embodiments of the present disclosure will be explained in detail with reference to the accompanying drawings.

Figure 1:
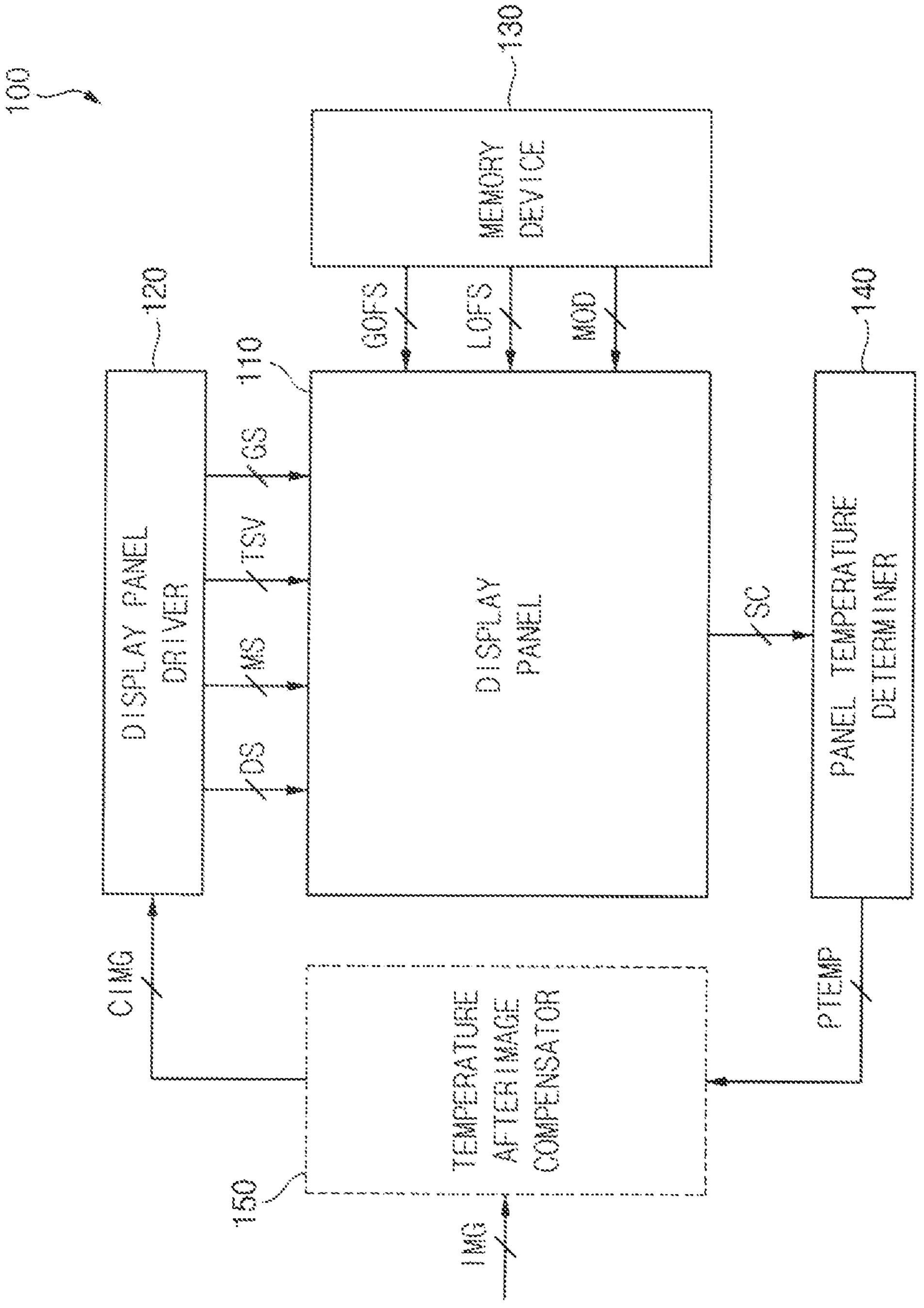
FIG. 1 is a block diagram illustrating a display device according to example embodiments of the present disclosure.
Figure 2:
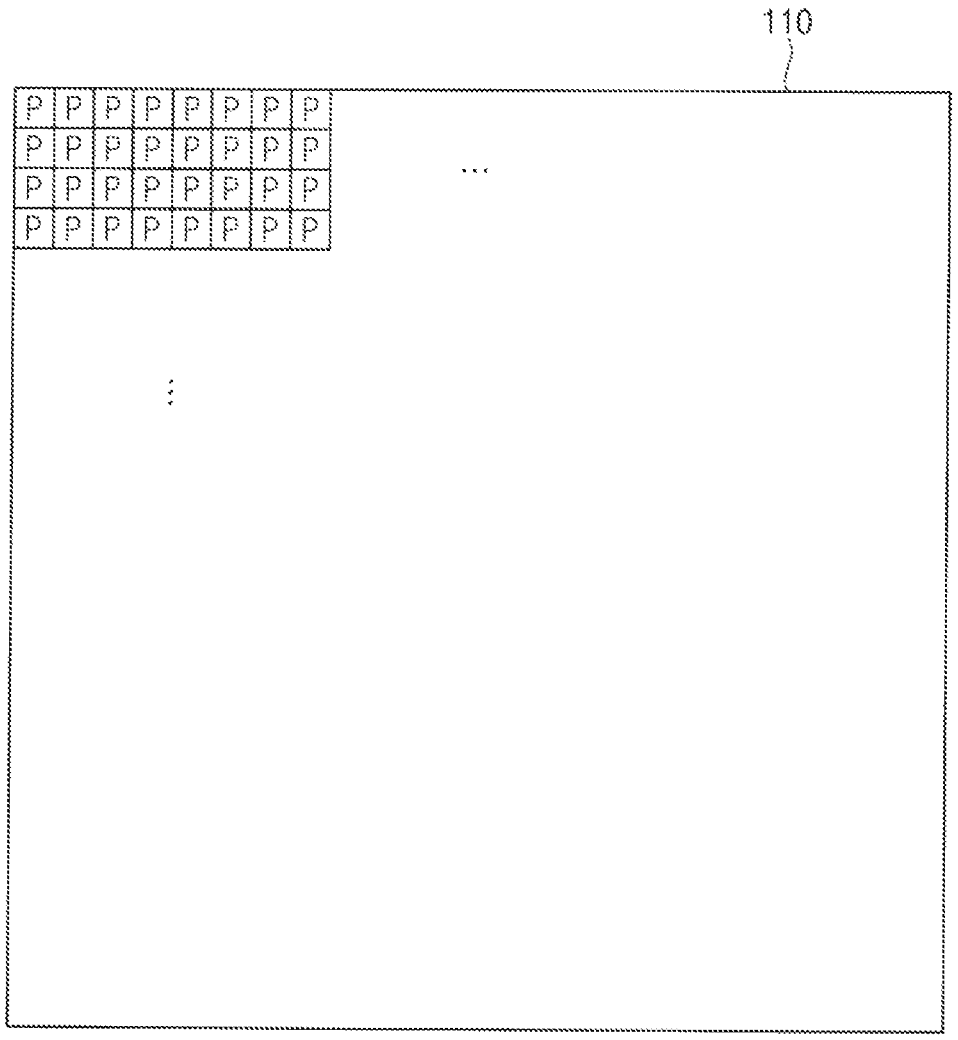
FIG. 2 is a diagram illustrating a display panel included in the display device of FIG. 1.
Figure 3:
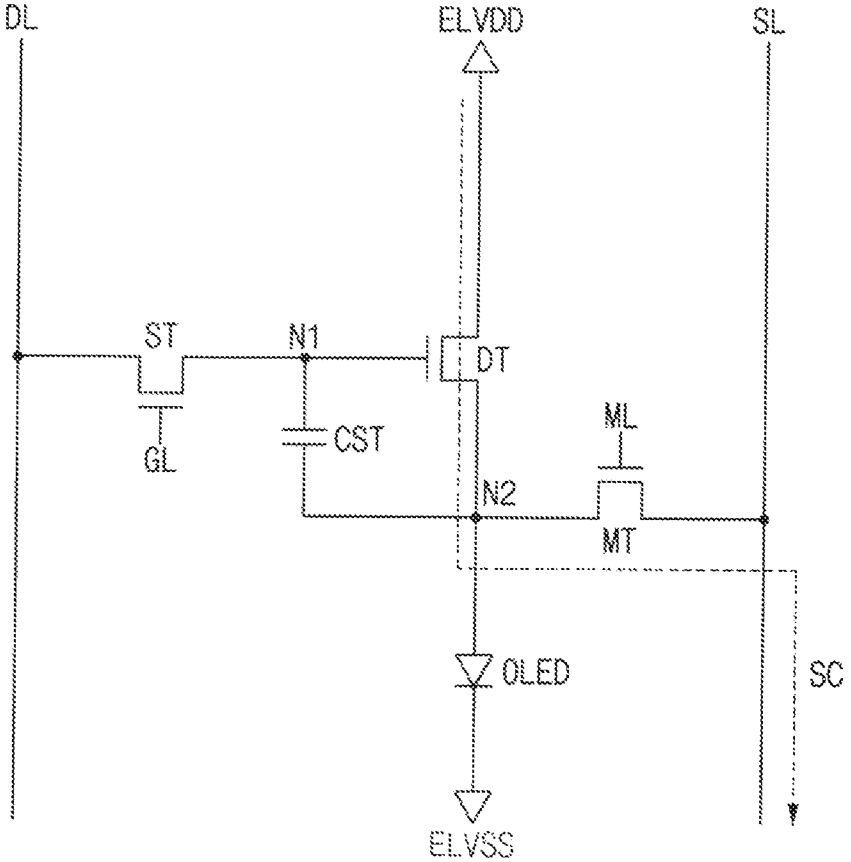
FIG. 3 is a circuit diagram illustrating an example of a pixel included in the display device of FIG. 1.
Figure 4:
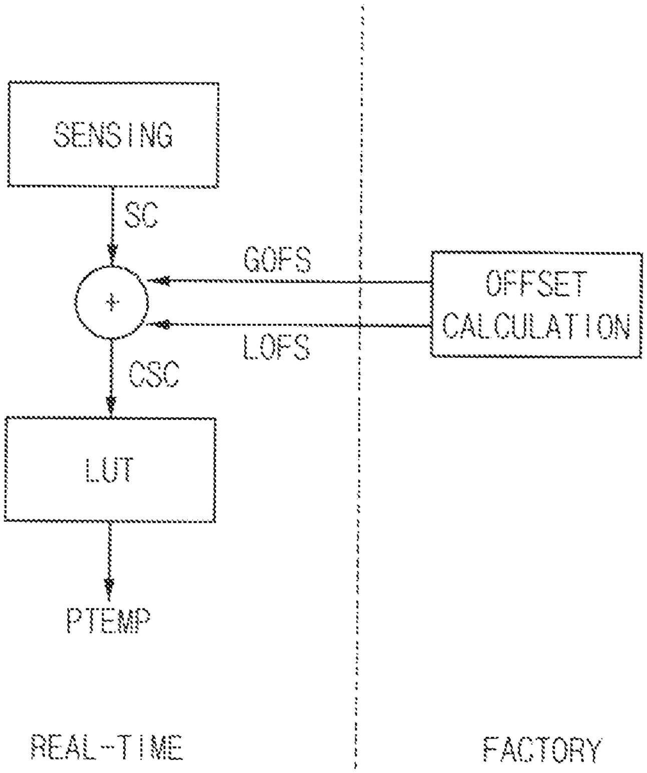
FIG. 4 is a block diagram illustrating a panel temperature determiner included in the display device of FIG. 1 determining a temperature of a pixel.

FIG. 1 is a block diagram illustrating a display device according to example embodiments of the present disclosure, FIG. 2 is a diagram illustrating a display panel included in the display device of FIG. 1, FIG. 3 is a circuit diagram illustrating an example of a pixel included in the display device of FIG. 1, and FIG. 4 is a block diagram illustrating a panel temperature determiner included in the display device of FIG. 1 determining a temperature of a pixel.

Referring to FIGS. 1 to 4, a display device 100 may include a display panel 110, a display panel driver 120 (also referred to as a display panel driving circuit), a memory device 130, and a panel temperature determiner 140 (also referred to as a panel temperature determining circuit). In addition, the display device 100 may further include a temperature afterimage compensator 150 (also referred to as a temperature afterimage compensating circuit). In an example embodiment, the display device 100 may be an organic light emitting display device. However, since the above configuration has been provided for illustrative purposes, a type of the display device 100 is not limited thereto.

The display panel 110 may include a plurality of pixels P. In this case, the pixels P may include a red display pixel, a green display pixel, and a blue display pixel. As shown in FIG. 2, the pixels P may be arranged in rows and columns within the display panel 110. The display panel 110 may perform a display operation in a unit of a frame, and one frame in which the display panel 110 operates may include an active period and a vertical blank period.

The pixel P may have a structure in which a sensing current SC is output through a sensing line SL when a temperature sensing voltage TSV is applied through a data line DL. For example, as shown in FIG. 3, the pixel P may include a driving transistor DT, a switching transistor ST, a sensing transistor MT, a storage capacitor CST, and an organic light emitting diode OLED. The driving transistor DT may include a first terminal configured to receive a high power supply voltage ELVDD, a second terminal connected to a second node N2, and a gate terminal connected to a first node N1. The switching transistor ST may include a first terminal connected to the data line DL, a second terminal connected to the first node N1, and a gate terminal connected to a gate line GL. The sensing transistor MT may include a first terminal connected to the second node N2, a second terminal connected to the sensing line SL, and a gate terminal connected to a sensing control line ML. The storage capacitor CST may include a first terminal connected to the first node N1, and a second terminal connected to the second node N2. The organic light emitting diode OLED may include a first terminal (e.g., an anode) connected to the second node N2, and a second terminal (e.g., a cathode) connected to a low power supply voltage ELVSS.

When the display operation is performed by the display panel 110, the sensing current SC of the pixel P may be measured in the vertical blank period of the one frame. For example, as shown in FIG. 3, the temperature sensing voltage TSV applied through the data line DL may flow through the switching transistor ST (e.g., when the switching transistor ST is turned on by a gate signal GS) to be applied to the first node N1, and the sensing current SC may flow through the driving transistor DT due to the temperature sensing voltage TSV stored in the storage capacitor CST, so that the sensing current SC may flow through the sensing transistor MT (e.g., when the sensing transistor MT is turned on by a sensing control signal MS) to be output through the sensing line SL. In this case, even when the same temperature sensing voltage TSV is applied, the sensing current SC may vary according to a temperature PTEMP of the pixel P. For example, when the same temperature sensing voltage TSV is applied, the sensing current SC may be increased as the temperature PTEMP of the pixel P becomes higher, and the sensing current SC may be decreased as the temperature PTEMP of the pixel P becomes lower. Therefore, the display device 100 may predict the temperature PTEMP of the pixel P by applying the same temperature sensing voltage TSV (e.g., a voltage of 5 V) to the pixel P, and measuring the sensing current SC flowing through the pixel P.

The display panel driver 120 may drive the display panel 110. To accomplish this, the display panel driver 120 may include a gate driver, a data driver, a sensing driver, a timing controller, and the like. The display panel 110 may be connected to the gate driver through gate lines GL, connected to the data driver through data lines DL, and connected to the sensing driver through sensing control lines ML, and the timing controller may be connected to the gate driver, the data driver, and the sensing driver.

The gate driver may provide gate signals GS to the display panel 110 through the gate lines GL. In other words, the gate driver may provide the gate signals GS to the pixels P.

The data driver may provide data signals DS (or data voltages) to the display panel 110 through the data lines DL. In other words, the data driver may provide the data signals DS to the pixels P. When a sensing current measurement operation for the pixels P is performed, the data driver may provide the temperature sensing voltage TSV to the pixels P through the data lines DL.

The sensing driver may provide sensing control signals MS to the display panel 110 through the sensing control lines ML. In other words, the sensing driver may provide the sensing control signals MS to the pixels P.

The timing controller may generate a plurality of control signals and provide the generated control signals to the gate driver, the data driver, and the sensing driver to control the gate driver, the data driver, and the sensing driver. In some embodiments, the timing controller may perform a predetermined processing (e.g., a deterioration compensation) on image data CIMG on which temperature afterimage compensation is performed, or on image data IMG before performing the temperature afterimage compensation.

The memory device 130 may store a reference current-temperature model MOD that is set for the display panel 110, a global offset GOFS of the display panel 110, which is calculated based on the reference current-temperature model MOD in a manufacturing stage of the display panel 110 (e.g., denoted by FACTORY in FIG. 4), and a local offset LOFS of the display panel 110, which is calculated based on a characteristic difference between the pixels P in the manufacturing stage of the display panel 110. The reference current-temperature model MOD is a representative model that is set for the display panel 110 by a manufacturer, and may include a relationship between the sensing current SC flowing through the pixel P and the temperature PTEMP of the pixel P when a preset temperature sensing voltage TSV (e.g., a voltage of 5 V) is applied to the pixel P included in the display panel 110. Therefore, the reference current-temperature model MOD may be set by the manufacturer (e.g., through an experiment, etc.) in consideration of a size, a resolution, backplane characteristics, and the like of the display panel 110, and may be collectively applied to the same products of the display panel 110. The reference current-temperature model MOD may be a linear model having an inclination of a temperature with respect to a current. In some embodiments, the reference current-temperature model MOD may be a piecewise linear model in which the inclination of the temperature with respect to the current varies for each section.

In an ideal case, when the same temperature sensing voltage TSV is applied to the pixels P included in the same product, in other words, the same display panel 110 at the same temperature, all of the sensing currents SC flowing through the pixels P should be equal to each other. However, since a characteristic deviation exists between pixels P included in one display panel 110 due to various aspects of a manufacturing process, even when the same temperature sensing voltage TSV is applied to the pixels P included in the display panel 110 at the same temperature, the sensing currents SC flowing through the pixels P may not be equal to each other. In addition, since a characteristic deviation exists even between the same display panels 110 (e.g., the same products) due to various aspects of the manufacturing process, even when the same temperature sensing voltage TSV is applied to the same display panels 110 at the same temperature, the sensing currents SC flowing through the display panels 110 may not be equal to each other.

For this reason, the memory device 130 may store the representative model that is set for the display panel 110 by a manufacturer, in other words, the reference current-temperature model MOD, and may store the global offset GOFS and the local offset LOFS of the display panel 110 when the global offset GOFS for removing the characteristic deviation existing between the display panels 110 in the manufacturing stage of the display panel 110 and the local offset LOFS for removing the characteristic deviation between the pixels P within the display panel 110 are calculated (e.g., denoted by OFFSET CALCULATION in FIG. 4). Accordingly, the display device 100 may predict the temperatures PTEMP of the pixels P (e.g., a panel temperature of the display panel 110) by measuring the sensing currents SC flowing through the pixels P as the temperature sensing voltage TSV is applied to the pixels P when the display panel 110 operates, applying the global offset GOFS and the local offset LOFS of the display panel 110 to the sensing currents SC, and substituting an application result into the reference current-temperature model MOD. In other words, the display device

100 may adjust (or update) the reference current-temperature model MOD with the result of applying the global offset GOFS and the local offset LOFS of the display panel 110 to the sensing currents SC. A method of calculating the global offset GOFS of the display panel 110 will be described below with reference to FIGS. 6 and 7, and a method of calculating the local offset LOFS of the display panel 110 will be described below with reference to FIGS. 8 to 9B.

The panel temperature determiner 140 may determine the temperatures PTEMP of the pixels P in an operation stage of the display panel 110 (e.g., denoted by REAL-TIME in FIG. 4). For example, the panel temperature determiner 140 may measure the sensing currents SC flowing through the pixels P as the temperature sensing voltage TSV is applied to the pixels P, calculate correction sensing currents CSC by applying the global offset GOFS and the local offset LOFS of the display panel 110 to the sensing currents SC, and determine the temperatures PTEMP of the pixels P by substituting the correction sensing currents CSC into the representative model that is set for the display panel 110 by a manufacturer, in other words, the reference current-temperature model MOD. In other words, as shown in FIG. 4, the sensing current SC flowing through the pixel P as the temperature sensing voltage TSV is applied to the pixel P may be measured (e.g., denoted by SENSING), the characteristic deviation existing between the display panels 110 may be removed as the global offset GOFS of the display panel 110 including the pixel P is applied to the sensing current SC, and the characteristic deviation between the pixels P within the display panel 110 including the pixel P may be removed as the local offset LOFS of the display panel 110 including the pixel P is applied to the sensing current SC. In this case, the temperature PTEMP of the pixel P may be accurately derived when the correction sensing current CSC obtained by applying the global offset GOFS and the local offset LOFS of the display panel 110 to the sensing current SC is substituted into the reference current-temperature model MOD (e.g., denoted by a look-up table (LUT) in FIG. 4). For example, the value of the sensing current SC in the reference current-temperature model MOD is adjusted (or changed) based on the correction sensing current CSC.

The temperature afterimage compensator 150 may perform the temperature afterimage compensation on the image data IMG that is to be applied to the pixels P based on the temperatures PTEMP of the pixels P. For example, the temperature afterimage compensator 150 may receive the image data IMG that is to be applied to the pixels P from an external component (e.g., a graphic processing unit (GPU), etc.), receive the temperatures PTEMP of the pixels P from the panel temperature determiner 140, compensate the image data IMG based on the temperatures PTEMP of the pixels P to generate compensated image data CIMG, and provide the compensated image data CIMG to the display panel driver 120. Thereafter, the data driver included in the display panel driver 120 may convert the compensated image data CIMG into the data signal DS (e.g., the data voltage) and provide the data signals DS obtained through the conversion to the pixels P.

As described above, the display device 100 may include the display panel 110 including pixels P, the display panel driver 120 configured to drive the display panel 110, the memory device 130 configured to store the reference current-temperature model MOD that is set for the display panel 110, the global offset GOFS of the display panel 110, which is calculated based on the reference current-temperature model MOD in a manufacturing stage of the display panel 110, and the local offset LOFS of the display panel

110, which is calculated based on a characteristic difference between the pixels P in the manufacturing stage of the display panel 110, and the panel temperature determiner 140 configured to measure sensing currents SC flowing through the pixels P as a temperature sensing voltage TSV is applied to the pixels P, calculate correction sensing currents CSC by applying the global offset GOFS and the local offset LOFS of the display panel 110 to the sensing currents SC, and determine temperatures PTEMP of the pixels P by substituting the correction sensing currents CSC into the reference current-temperature model MOD. Accordingly, the display device 100 may not include a temperature sensor such that it can be manufactured at a low cost and in a small size, and may reflect all of a characteristic deviation between a plurality of the display panels 110, a characteristic deviation between pixels P within its display panel 110, and an external environment temperature at which its display panel 110 operates such that it can accurately identify temperatures PTEMP of the pixels P. Therefore, temperature afterimage compensation may be accurately performed on image data IMG that is to be applied to the pixels P through the temperature afterimage compensator 150. Although the display panel driver 120 has been shown in FIG. 1 as having a configuration that is provided separately from the panel temperature determiner 140 and the temperature afterimage compensator 150, in some embodiments, at least two of the display panel driver 120, the panel temperature determiner 140, and the temperature afterimage compensator 150 may be implemented as one configuration.

Figure 5:
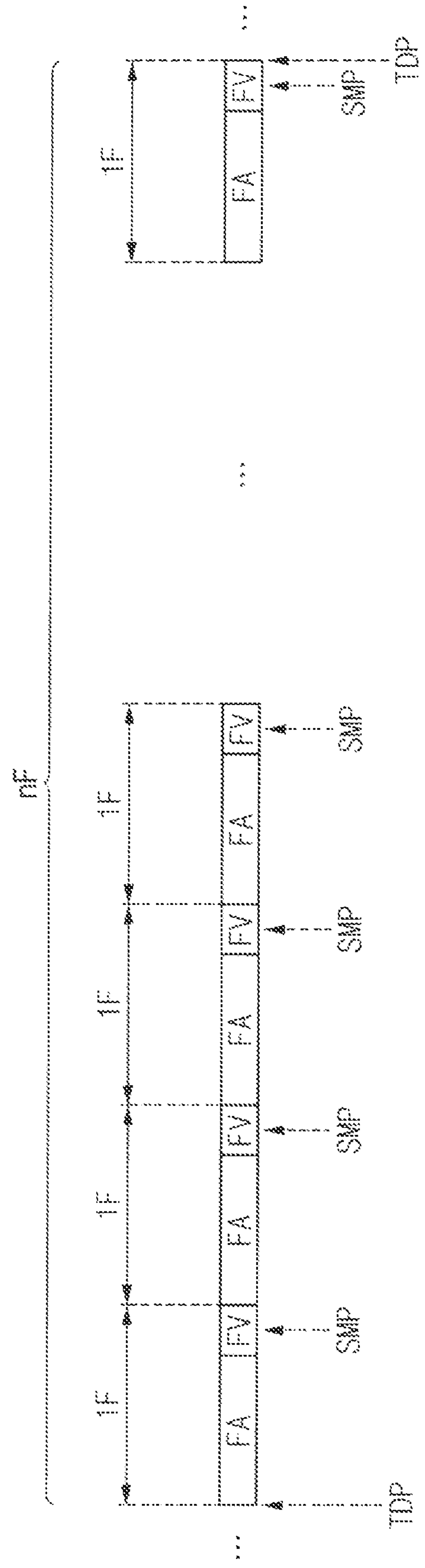
FIG. 5 is a diagram illustrating an example in which a sensing current measurement operation and a panel temperature determination operation for a pixel are performed in the display device of FIG. 1.

FIG. 5 is a diagram illustrating an example in which a sensing current measurement operation and a panel temperature determination operation for a pixel are performed in the display device of FIG. 1.

Referring to FIG. 5, one frame 1F in which the display panel 110 operates may include an active period FA and a vertical blank period FV, the sensing currents SC flowing through the pixels P during the vertical blank period FV of the one frame 1F may be measured (e.g., denoted by SMP), and the temperatures PTEMP of the pixels P included in the display panel 110 may be determined in a unit of n frames nF (where n is an integer that is greater than or equal to 2) (e.g., denoted by TDP).

For example, the panel temperature determiner 140 may measure the sensing currents SC flowing through the pixels P during the vertical blank period FV of the one frame 1F. In this case, since the panel temperature determiner 140 measures the sensing currents SC flowing through the pixels P only during the vertical blank period FV of the one frame 1F, there may be a limit to the number of pixels P whose sensing currents SC are measured during the vertical blank period FV of the one frame 1F. Therefore, the panel temperature determiner 140 may measure the sensing currents SC flowing through the pixels P included in the display panel 110 over the n frames nF.

For example, the panel temperature determiner 140 may perform the sensing current measurement operation SMP on one pixel row during the vertical blank period FV of the one frame 1F. In an example embodiment, the panel temperature determiner 140 may perform the sensing current measurement operation SMP only on red display pixels, perform the sensing current measurement operation SMP only on green display pixels, or perform the sensing current measurement operation SMP only on blue display pixels when performing the sensing current measurement operation SMP on the one pixel row. In another example embodiment, the panel temperature determiner 140 may perform the sensing current measurement operation SMP on all of the red display pixels, the green display pixels, and the blue display pixels when performing the sensing current measurement operation SMP on the one pixel row.

In some example embodiments, the panel temperature determiner 140 may not perform the sensing current measurement operation SMP during the vertical blank period FV of the one frame 1F under a predetermined condition (e.g., a condition in which the sensing current measurement operation SMP may be visually recognized by a user when the sensing current measurement operation SMP is performed, etc.). For example, in a low gray level frame in which image data IMG of the one frame 1F has a relatively low gray level, when the temperature sensing voltage TSV is applied to one pixel row during the vertical blank period FV of the frame 1F, the pixel row may be visually recognized by the user. Therefore, the panel temperature determiner 140 may not perform the sensing current measurement operation SMP during the vertical blank period FV of the one frame 1F in a low gray level frame. This will be described in detail below with reference to FIG. 10.

Thereafter, when the sensing current measurement operation SMP for all of the pixels P included in the display panel 110 is completed, the panel temperature determiner 140 may perform a panel temperature determination operation TDP for determining the temperatures PTEMP of all the pixels P included in the display panel 110. In this case, since the panel temperature determiner 140 measures the sensing currents SC flowing through the pixels P included in the display panel 110 over the n frames nF, the temperatures PTEMP of the pixels P included in the display panel 110 may be determined in a unit of the n frames nF (e.g., denoted by TDP).

Figure 6:
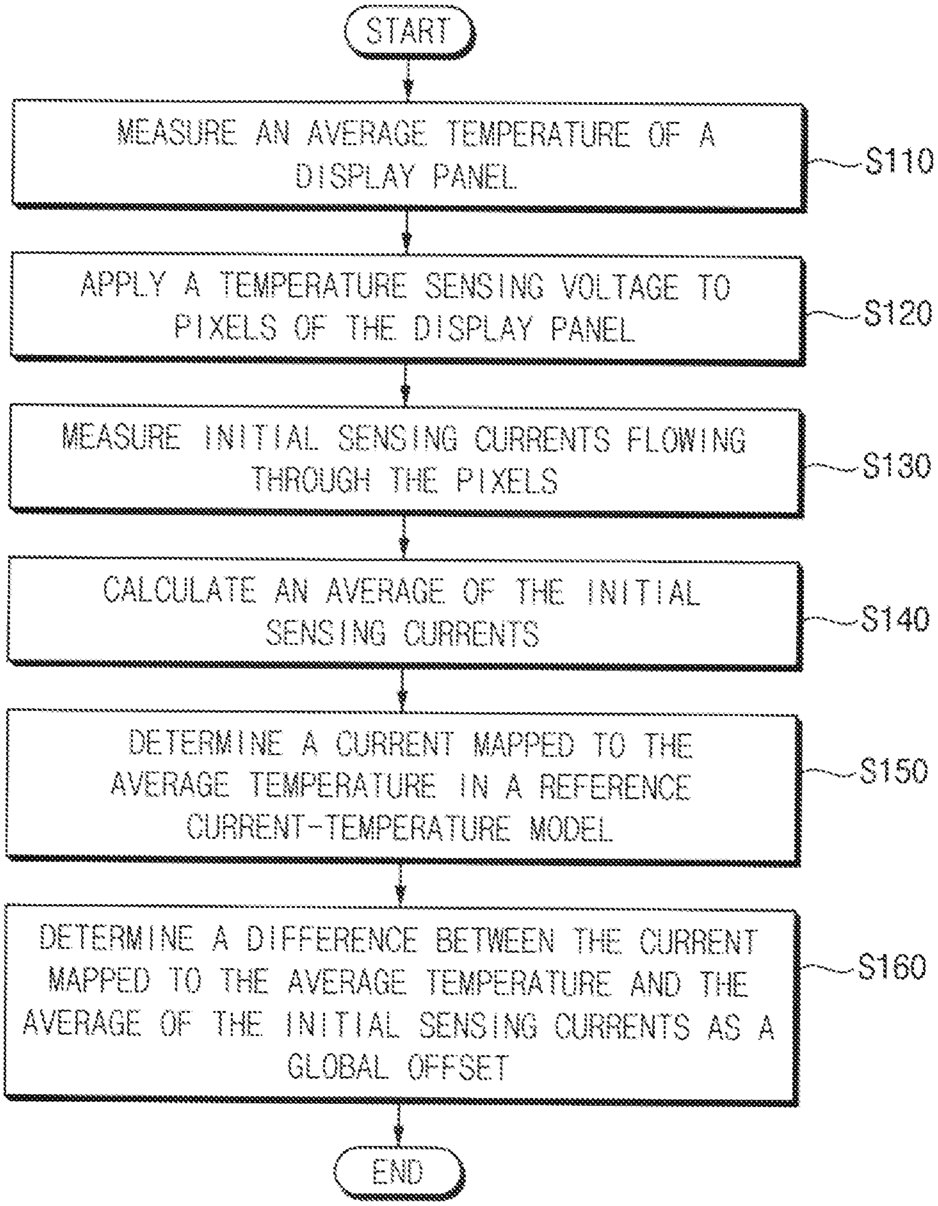
FIG. 6 is a flowchart illustrating a calculation of a global offset stored in a memory device included in the display device of FIG. 1.
Figure 7:
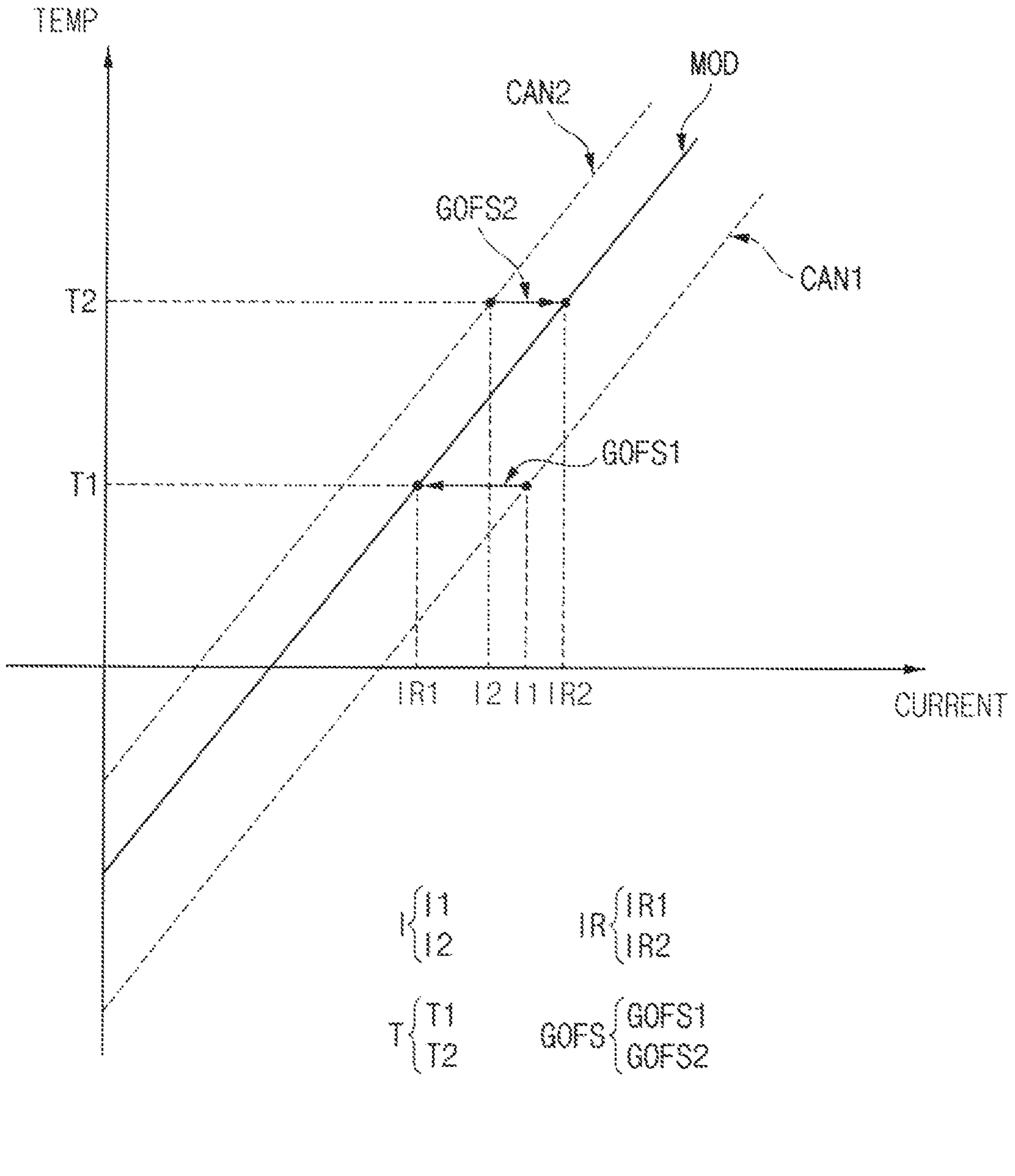
FIG. 7 is a diagram for describing a calculation of a global offset stored in a memory device included in the display device of FIG. 1.

FIG. 6 is a flowchart illustrating a calculation of a global offset stored in a memory device included in the display device of FIG. 1, and FIG. 7 is a diagram for describing a calculation of a global offset stored in a memory device included in the display device of FIG. 1.

Referring to FIGS. 6 and 7, a global offset calculation method of FIG. 6 may include measuring an average temperature T of a display panel 110 (S110), applying a temperature sensing voltage TSV to pixels P of the display panel 110 (S120), measuring initial sensing currents flowing through the pixels P of the display panel 110 (S130), calculating an average I of the initial sensing currents (S140), determining a current IR mapped to the average temperature T of the display panel 110 in a reference current-temperature model MOD (S150), and determining a difference between the current IR mapped to the average temperature T of the display panel 110 and the average I of the initial sensing currents as a global offset GOFS (S160). Since the initial sensing current of the pixel P measured in a manufacturing stage of the display panel 110 and the sensing current SC of the pixel P measured during a display operation of the display panel 110 are values that are to be substituted into the reference current-temperature model MOD, the initial sensing current of the pixel P measured in the manufacturing stage of the display panel 110 and the sensing current SC of the pixel P measured during the display operation of the display panel 110 may be determined in a unit of a current (CURRENT) axis of the reference current-temperature model MOD, and the average temperature T of the display panel 110 and the temperature PTEMP of the pixel P may be determined in a unit of a temperature (TEMP) axis of the reference current-temperature model MOD.

For example, the global offset calculation method of FIG. 6 may include measuring the average temperature T of the display panel 110 (S110). In this case, in the global offset calculation method of FIG. 6, the average temperature T of the display panel 110 may be measured by using a temperature sensing device in the manufacturing stage of the display panel 110. The average temperature T of the display panel 110 may be used for determining the global offset GOFS of the display panel 110, and may be an actual temperature of an environment in which the display panel 110 is manufactured (e.g., a factory, etc.) because the average temperature T of the display panel 110 is measured while the display panel 110 does not operate. For example, FIG. 7 shows that an average temperature T of a first display panel measured by the temperature sensing device is T1 (e.g., a temperature of an environment in which the first display panel is manufactured is T1) in a situation where a global offset GOFS of the first display panel is determined, and an average temperature T of a second display panel measured by the temperature sensing device is T2 (e.g., a temperature of an environment in which the second display panel is manufactured is T2) in a situation where a global offset GOFS of the second display panel is determined.

Thereafter, the global offset calculation method of FIG. 6 may include applying the temperature sensing voltage TSV to the pixels P of the display panel 110 (S120), and measuring the initial sensing currents flowing through the pixels P of the display panel 110 (S130). Since a sensing current measurement operation SMP for measuring sensing currents SC flowing through the pixels P is performed during a vertical blank period FV of one frame 1F during a display operation of the display panel 110, a sensing current measurement operation SMP for all of the pixels P included in the display panel 110 may be completed over n frames nF. However, since a sensing current measurement operation for measuring the initial sensing currents flowing through the pixels P is performed without any specific time constraint in the manufacturing stage of the display panel 110, the sensing current measurement operation for all of the pixels P included in the display panel 110 may be performed at once during a preset time.

Next, when the initial sensing currents flowing through all of the pixels P included in the display panel 110 are measured, the global offset calculation method of FIG. 6 may include calculating the average I of the initial sensing currents (S140). For example, FIG. 7 shows that an average I of initial sensing currents flowing through all of the pixels P included in the first display panel is I1 when the average temperature T of the first display panel is T1 in the situation where the global offset GOFS of the first display panel is determined, and an average I of initial sensing currents flowing through all of the pixels P included in the second display panel is I2 when the average temperature T of the second display panel is T2 in the situation where the global offset GOFS of the second display panel is determined. In this case, since all of a representative display panel, the first display panel, and the second display panel are the same products, it may be assumed that all of inclinations of temperatures with respect to currents are the same. In other words, it may be assumed that the representative display panel has a characteristic of the reference current-temperature model MOD, it may be assumed that the first display panel has a characteristic of a first current-temperature model CAN1, and it may be assumed that the second display panel has a characteristic of a second current-temperature model CAN2. As shown in FIG. 7, the reference current-temperature model MOD is located between the first current-temperature model CAN1 and the second current-temperature model CAN2.

Thereafter, the global offset calculation method of FIG. 6 may include determining the current IR mapped to the average temperature T of the display panel 110 in the reference current-temperature model MOD (S150). For example, FIG. 7 shows that a current IR mapped to T1 that is the average temperature T of the first display panel in the reference current-temperature model MOD is IR1 in the situation where the global offset GOFS of the first display panel is determined, and a current IR mapped to T2 that is the average temperature T of the second display panel in the reference current-temperature model MOD is IR2 in the situation where the global offset GOFS of the second display panel is determined. In mapping the current IR to T1, which is the average temperature T of the first display panel, the I1 level of the first current-temperature model CAN1 is denoted as IR1 in the reference current-temperature model MOD. Similarly, in mapping the current IR to T2, which is the average temperature T of the second display panel, the I2 level of the second current-temperature model CAN2 is denoted as IR2 in the reference current-temperature model MOD.

Next, the global offset calculation method of FIG. 6 may include determining the difference between the current IR mapped to the average temperature T of the display panel 110 and the average I of the initial sensing currents as the global offset GOFS (S160). For example, as shown in FIG. 7, since the average I of the initial sensing currents flowing through all of the pixels P included in the first display panel at T1 that is the average temperature T of the first display panel is I1, and the current IR mapped to T1 that is the average temperature T of the first display panel in the reference current-temperature model MOD is IR1, GOFS1, which is a global offset GOFS of the first display panel, may be determined as IR1-I1 (in other words, IR1 minus I1) that corresponds to a difference between IR1, which is the current IR mapped to T1 that is the average temperature T of the first display panel in the reference current-temperature model MOD, and I1, which is the average I of the initial sensing currents flowing through all of the pixels P included in the first display panel. In addition, since the average I of the initial sensing currents flowing through all of the pixels P included in the second display panel at T2 that is the average temperature T of the second display panel is I2, and the current IR mapped to T2 that is the average temperature T of the second display panel in the reference current-temperature model MOD is IR2, GOFS2, which is a global offset GOFS of the second display panel, may be determined as IR2–I2 (in other words, IR2 minus I2) that corresponds to a difference between IR2, which is the current IR mapped to T2 that is the average temperature T of the second display panel in the reference current-temperature model MOD, and I2, which is the average I of the initial sensing currents flowing through all of the pixels P included in the second display panel.

Figure 8:
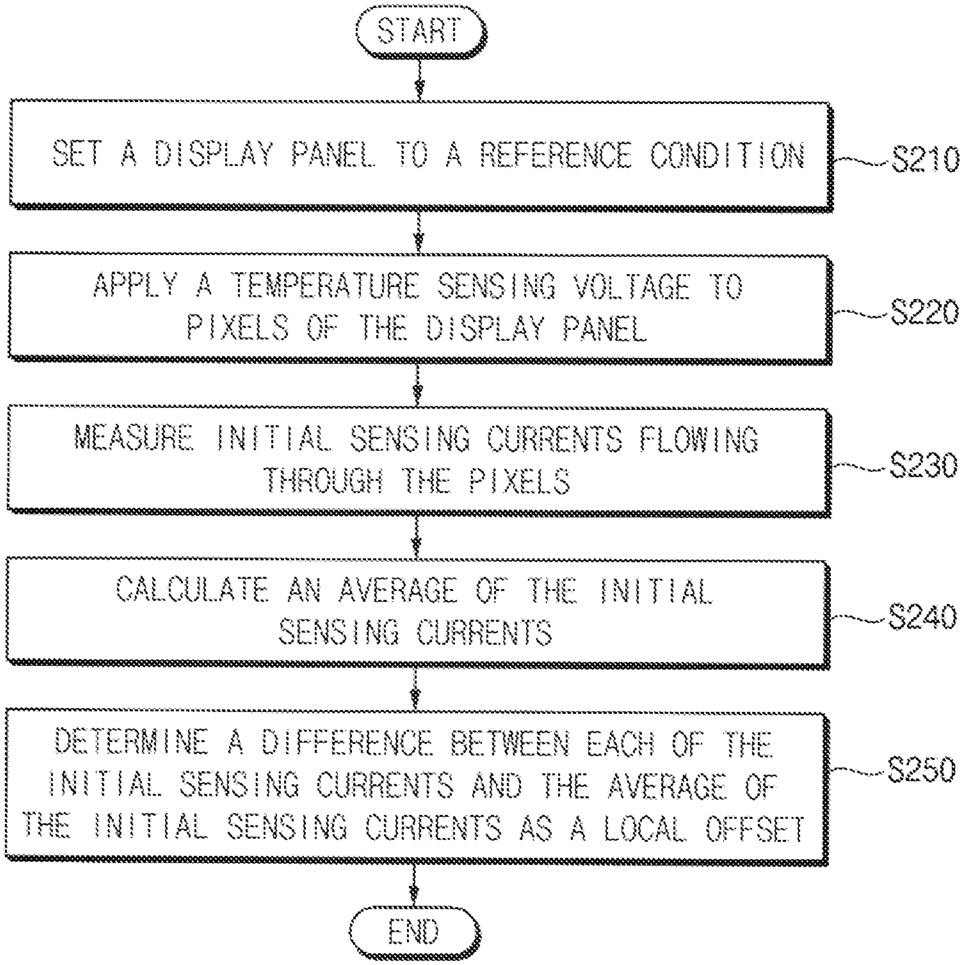
FIG. 8 is a flowchart illustrating a calculation of a local offset stored in a memory device included in the display device of FIG. 1.
Figure 9A:
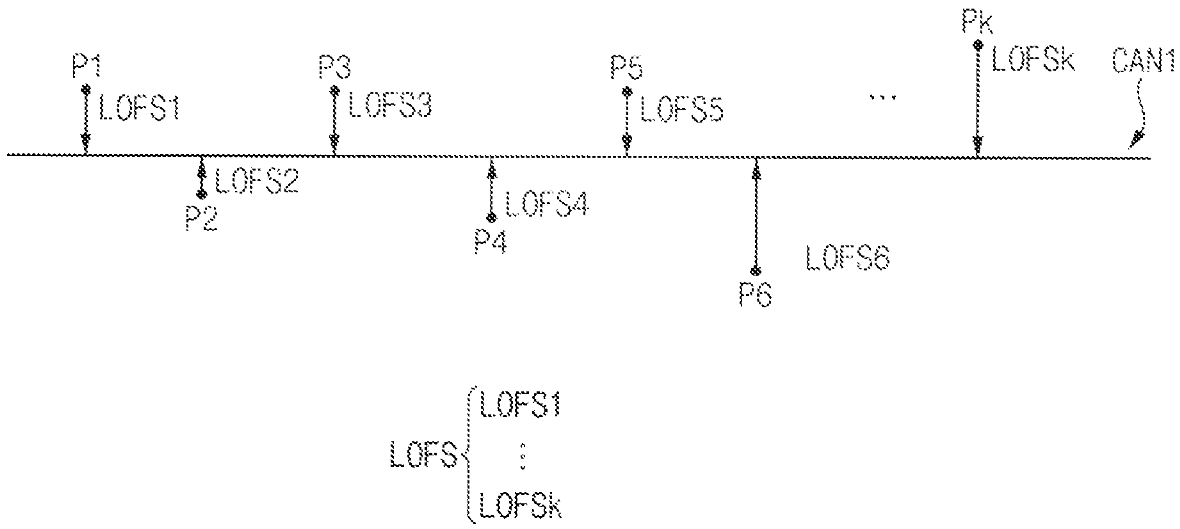
FIGS. 9A and 9B are diagrams for describing a calculation of a local offset stored in a memory device included in the display device of FIG. 1.
Figure 9B:
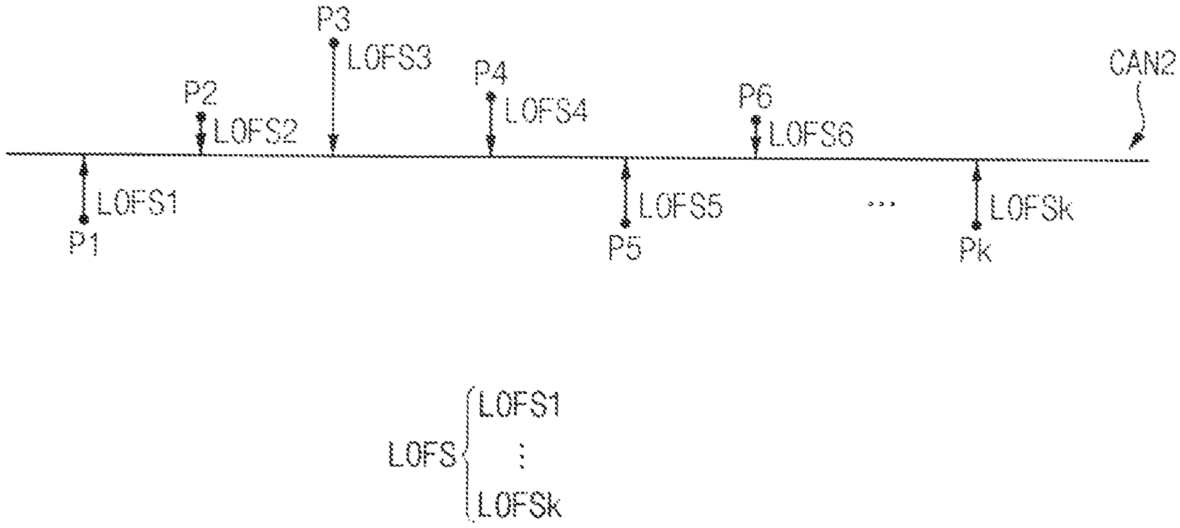

FIG. 8 is a flowchart illustrating a calculation of a local offset stored in a memory device included in the display device of FIG. 1, and FIGS. 9A and 9B are diagrams for describing a calculation of a local offset stored in a memory device included in the display device of FIG. 1.

Referring to FIGS. 8 to 9B, a local offset calculation method of FIG. 8 may include setting a display panel 110 to a reference condition (S210), applying a temperature sensing voltage TSV to pixels P of the display panel 110 (S220), measuring initial sensing currents flowing through the pixels P of the display panel 110 (S230), calculating an average I of the initial sensing currents (S240), and determining a difference between each of the initial sensing currents and the average I of the initial sensing currents as a local offset LOFS of the display panel 110 (S250).

For example, the local offset calculation method of FIG. 8 may include setting the display panel 110 to the reference condition (S210). In other words, the local offset LOFS of the display panel 110 may be used to remove a characteristic deviation existing between the pixels P included in the display panel 110 due to various causes in a manufacturing process, so that the display panel 110 may be set to the reference condition to put the pixels P under the same condition. For example, in the local offset calculation method of FIG. 8, the display panel 110 may be set to the reference condition by applying a black display gray level to the display panel 110.

Thereafter, the local offset calculation method of FIG. 8 may include applying the temperature sensing voltage TSV to the pixels P of the display panel 110 (S220), and measuring the initial sensing currents flowing through the pixels P of the display panel 110 (S230). Since a sensing current measurement operation SMP for measuring sensing currents SC flowing through the pixels P is performed during a vertical blank period FV of one frame 1F during a display operation of the display panel 110, a sensing current measurement operation SMP for all of the pixels P included in the display panel 110 may be completed over n frames nF. However, since a sensing current measurement operation for measuring the initial sensing currents flowing through the pixels P is performed without any specific time constraint in a manufacturing stage of the display panel 110, the sensing current measurement operation for all of the pixels P included in the display panel 110 may be performed at once during a preset time.

Next, when the initial sensing currents flowing through all of the pixels P included in the display panel 110 are measured, the local offset calculation method of FIG. 8 may include calculating the average I of the initial sensing currents (S240). For example, FIG. 9A shows a situation where a local offset LOFS of a first display panel is determined. In FIG. 9A, an average I of initial sensing currents flowing through all of the pixels P included in the first display panel is shown as CAN1. In addition, FIG. 9B shows a situation where a local offset LOFS of a second display panel is determined. In FIG. 9B, an average I of initial sensing currents flowing through all of the pixels P included in the second display panel is shown as CAN2.

Thereafter, the local offset calculation method of FIG. 8 may include determining the difference between each of the initial sensing currents and the average I of the initial sensing currents as the local offset LOFS (S250). For example, as shown in FIG. 9A, in determining a local offset LOFS of the first display panel, LOFS1 corresponding to a difference between an initial sensing current flowing through a first pixel P1 and the average I of the initial sensing currents (e.g., denoted by CAN1) may be determined as a local offset LOFS for the first pixel P1, LOFS2 corresponding to a difference between an initial sensing current flowing through a second pixel P2 and the average I of the initial sensing currents (e.g., denoted by CAN1) may be determined as a local offset LOFS for the second pixel P2, LOFS3 corresponding to a difference between an initial sensing current flowing through a third pixel P3 and the average I of the initial sensing currents (e.g., denoted by CAN1) may be determined as a local offset LOFS for the third pixel P3, and LOFSk corresponding to a difference between an initial sensing current flowing through a $k^{th}$ pixel Pk (where k is an integer that is greater than or equal to 2) and the average I of the initial sensing currents (e.g., denoted by CAN1) may be determined as a local offset LOFS for the $k^{th}$ pixel Pk. Similarly, as shown in FIG. 9B, in determining a local offset LOFS of the second display panel, LOFS1 corresponding to a difference between an initial sensing current flowing through a first pixel P1 and the average I of the initial sensing currents (e.g., denoted by CAN2) may be determined as a local offset LOFS for the first pixel P1, LOFS2 corresponding to a difference between an initial sensing current flowing through a second pixel P2 and the average I of the initial sensing currents (e.g., denoted by CAN2) may be determined as a local offset LOFS for the second pixel P2, LOFS3 corresponding to a difference between an initial sensing current flowing through a third pixel P3 and the average I of the initial sensing currents (e.g., denoted by CAN2) may be determined as a local offset LOFS for the third pixel P3, and LOFSk corresponding to a difference between an initial sensing current flowing through a $k^{th}$ pixel Pk and the average I of the initial sensing currents (e.g., denoted by CAN2) may be determined as a local offset LOFS for the $k^{th}$ pixel Pk.

Figure 10:
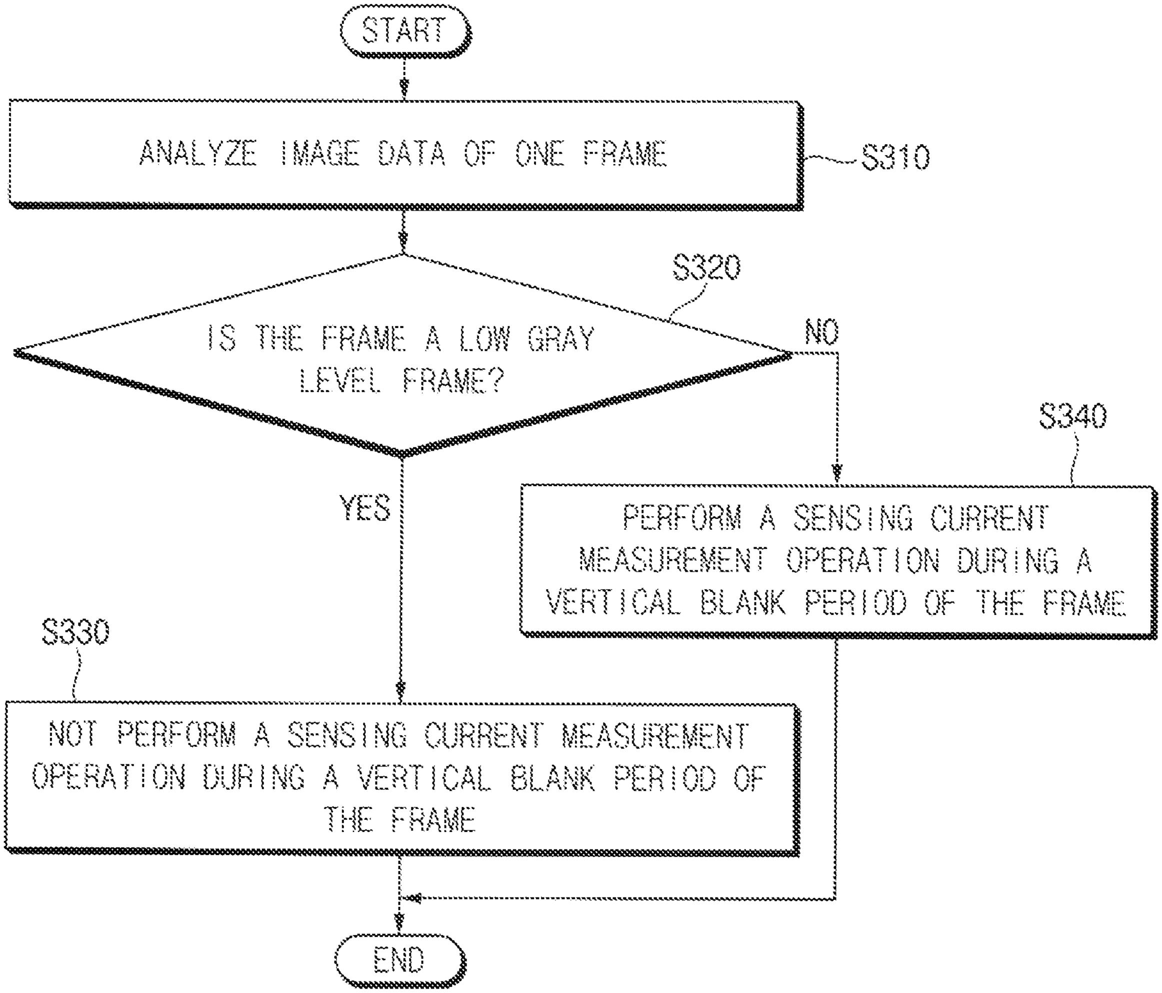
FIG. 10 is a flowchart illustrating a panel temperature determiner included in the display device of FIG. 1 determining whether to perform a sensing current measurement operation based on image data of a frame.

FIG. 10 is a flowchart illustrating a panel temperature determiner included in the display device of FIG. 1 determining whether to perform a sensing current measurement operation based on image data of a frame.

Referring to FIG. 10, the panel temperature determiner 140 may analyze image data IMG of one frame 1F (S310), determine whether the one frame 1F is a preset low gray level frame (S320), not perform a sensing current measurement operation SMP on one pixel row during a vertical blank period FV of the one frame 1F when the one frame 1F is the preset low gray level frame (S330), and perform the sensing current measurement operation SMP on the one pixel row during the vertical blank period FV of the one frame 1F when the one frame 1F is not the preset low gray level frame (S340). In other words, the panel temperature determiner 140 may not perform the sensing current measurement operation SMP during the vertical blank period FV of the one frame 1F in the preset low gray level frame.

As described above, the panel temperature determiner 140 may not perform the sensing current measurement operation SMP during the vertical blank period FV of the one frame 1F under a predetermined condition (e.g., a condition in which the sensing current measurement operation SMP may be visually recognized by a user when the sensing current measurement operation SMP is performed, etc.). In other words, in a low gray level frame in which image data IMG of the one frame 1F has a relatively low gray level, when a temperature sensing voltage TSV is applied to one pixel row during the vertical blank period FV of the frame 1F, the pixel row may be visually recognized by a user. Therefore, the panel temperature determiner 140 may not perform the sensing current measurement operation SMP during the vertical blank period FV of the one frame 1F in a preset low gray level frame.

In an example embodiment, the panel temperature determiner 140 may determine the one frame 1F as the preset low gray level frame when a maximum gray level of the image data IMG of the one frame 1F is less than a reference gray level. In another example embodiment, the panel temperature determiner 140 may determine the one frame 1F as the preset low gray level frame when a minimum gray level of the image data IMG of the one frame 1F is less than the reference gray level. In a still another example embodiment, the panel temperature determiner 140 may determine the one frame 1F as the preset low gray level frame when an average gray level of the image data IMG of the one frame 1F is less than the reference gray level. Although the determining of whether the one frame 1F is the preset low gray level frame has been described above as being performed based on the image data IMG of the one frame 1F, in some example embodiments, the determining of whether the one frame 1F is the preset low gray level frame may be performed based on compensated image data CIMG of the one frame 1F.

Figure 11:
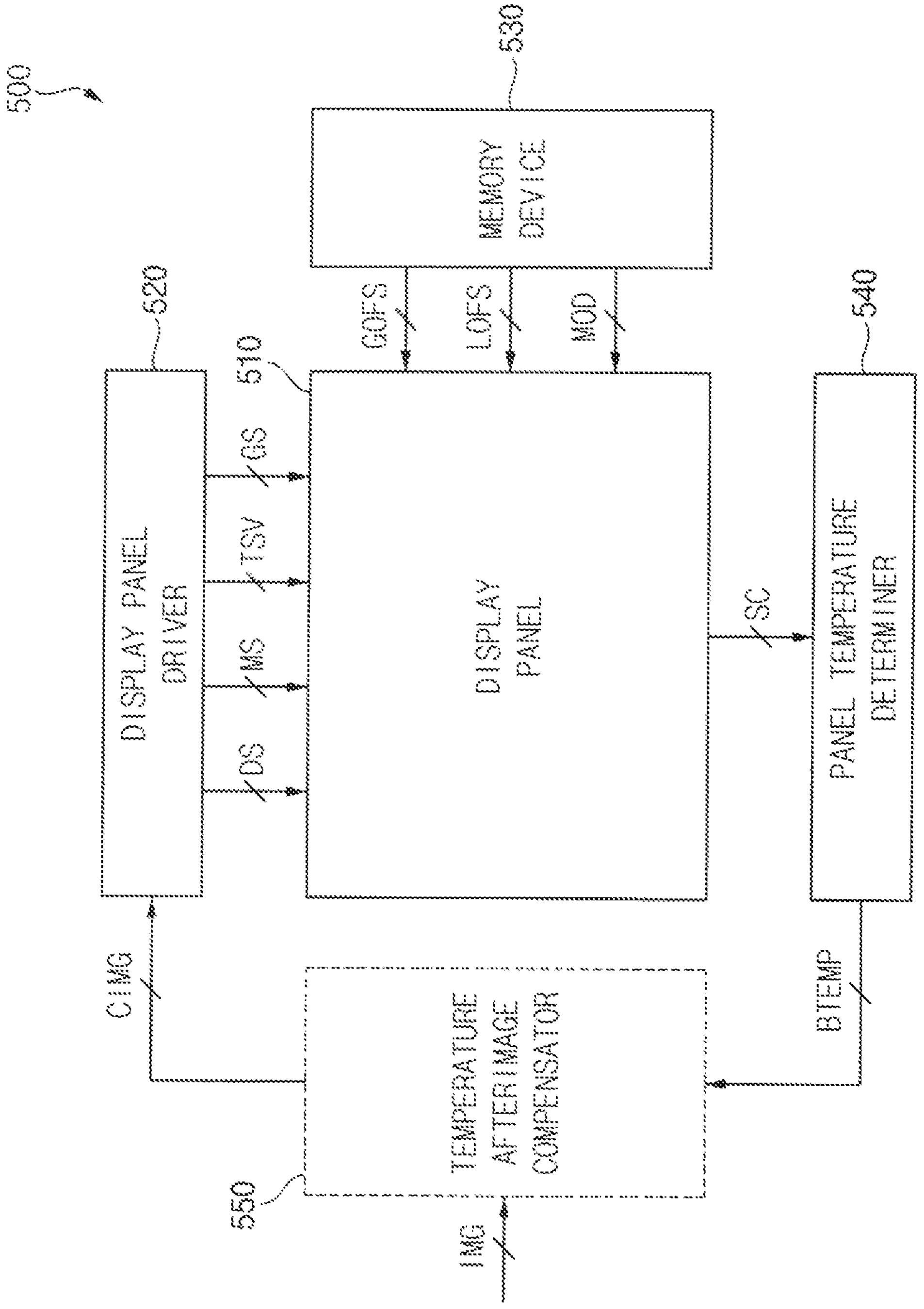
FIG. 11 is a block diagram illustrating a display device according to example embodiments of the present disclosure.
Figure 12:
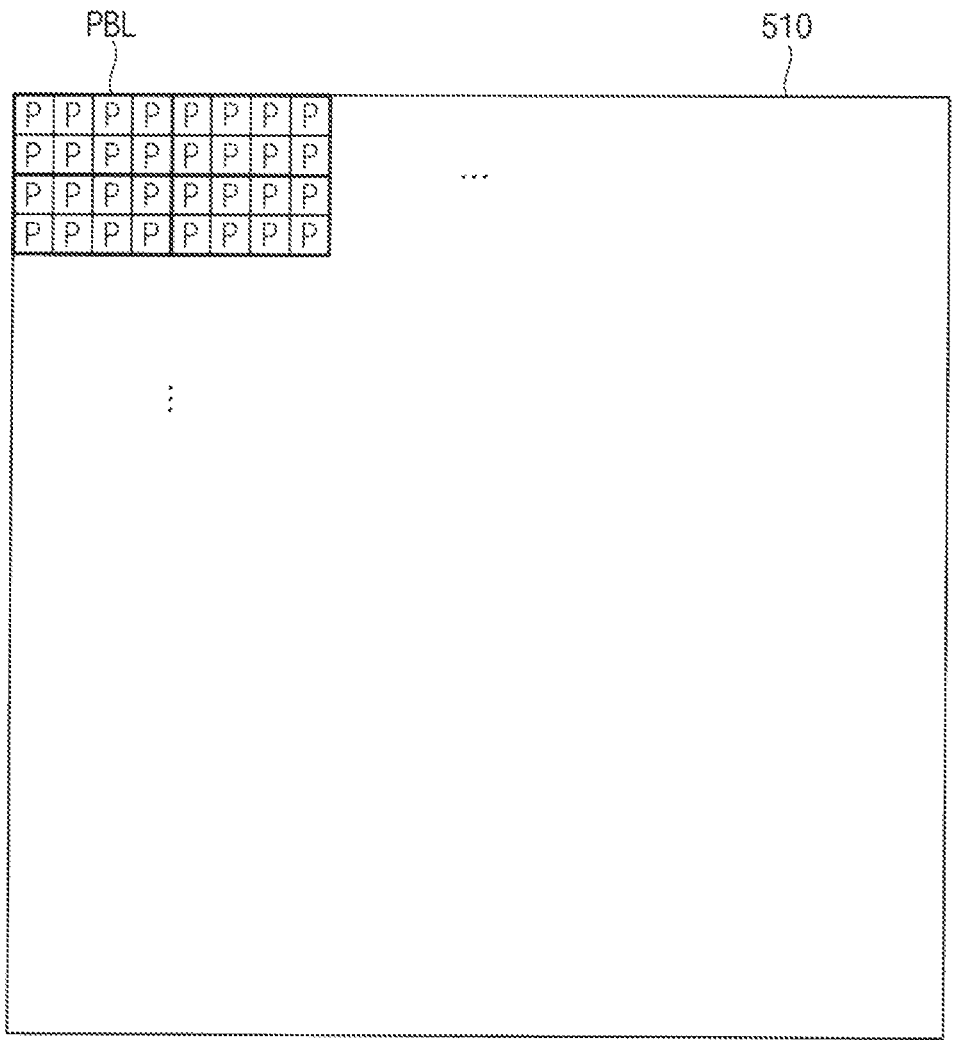
FIG. 12 is a diagram illustrating a display panel included in the display device of FIG. 11.
Figure 13:
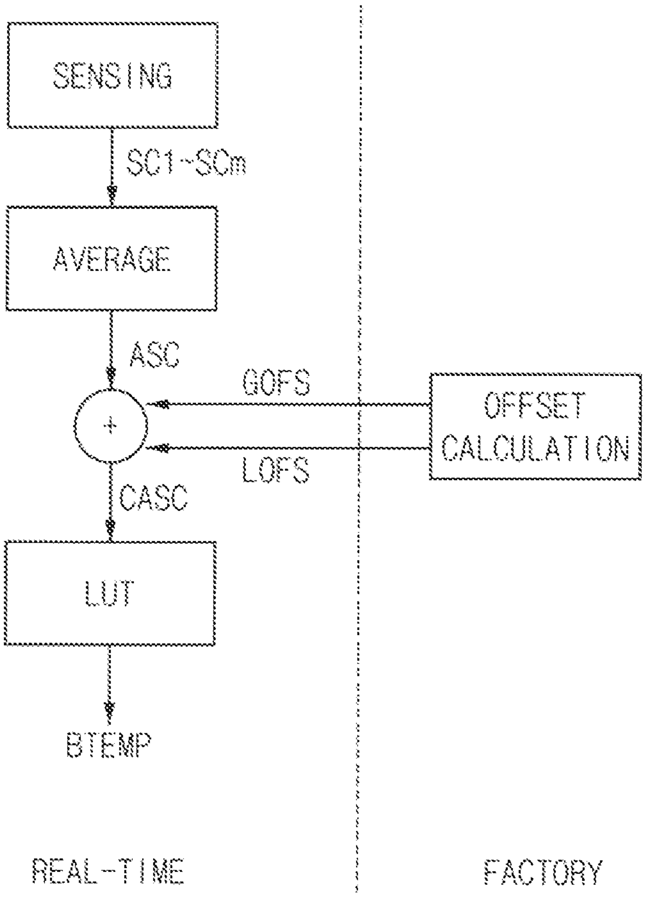
FIG. 13 is a block diagram illustrating a panel temperature determiner included in the display device of FIG. 11 determining a temperature of a pixel.

FIG. 11 is a block diagram illustrating a display device according to example embodiments of the present disclosure, FIG. 12 is a diagram illustrating a display panel included in the display device of FIG. 11, and FIG. 13 is a block diagram illustrating a panel temperature determiner included in the display device of FIG. 11 determining a temperature of a pixel.

Referring to FIGS. 11 to 13, a display device 500 may include a display panel 510, a display panel driver 520 (also referred to as a display panel driving circuit), a memory device 530, and a panel temperature determiner 540 (also referred to as a panel temperature determining circuit). In addition, the display device 500 may further include a temperature afterimage compensator 550 (also referred to as a temperature afterimage compensating circuit). In an example embodiment, the display device 500 may be an organic light emitting display device. However, since the above configuration has been provided for illustrative purposes, a type of the display device 500 is not limited thereto. The display device 500 of FIG. 11 is substantially the same as the display device 100 of FIG. 1 except that the panel temperature determination operation is performed in a unit of pixel blocks PBL rather than the pixels P in terms of memory efficiency, and thus, redundant descriptions of the display device 500 of FIG. 11 corresponding to the display device 100 of FIG. 1 may be omitted.

The display panel 510 may include a plurality of pixels P, which are grouped into pixel blocks PBL. In this case, the pixels P may include a red display pixel, a green display pixel, and a blue display pixel. The pixel P may have a structure in which a sensing current SC is output through a sensing line when a temperature sensing voltage TSV is applied through a data line. As shown in FIG. 12, pixels P may be arranged in rows and columns within the display panel 510, and adjacent pixels P may constitute one pixel block PBL. The number of pixels P constituting the pixel block PBL is not limited to that shown in FIG. 12. The display panel 510 may perform a display operation in a unit of a frame, and one frame in which the display panel 510 operates may include an active period and a vertical blank period. When the display operation is performed by the display panel 510, the sensing current SC of the pixel P may be measured in the vertical blank period of the one frame.

The display panel driver 520 may drive the display panel 510. To accomplish this, the display panel driver 520 may include a gate driver, a data driver, a sensing driver, a timing controller, and the like. The gate driver may provide gate signals GS to the display panel 510 through the gate lines GL. The data driver may provide data signal DS (or data voltages) to the display panel 510 through the data lines DL. When a sensing current measurement operation for the pixels P is performed, the data driver may provide the temperature sensing voltage TSV to the pixels P through the data lines DL. The sensing driver may provide sensing control signals MS to the display panel 510 through the sensing control lines ML. The timing controller may generate a plurality of control signals and provide the generated control signals to the gate driver, the data driver, and the sensing driver to control the gate driver, the data driver, and the sensing driver. In some example embodiments, the timing controller may perform a predetermined processing (e.g., deterioration compensation) on image data CIMG on which temperature afterimage compensation is performed, or on image data IMG which has not undergone the temperature afterimage compensation.

The memory device 530 may store a reference current-temperature model MOD that is set for the display panel 510, a global offset GOFS of the display panel 510, which is calculated based on the reference current-temperature model MOD in a manufacturing stage of the display panel 510 (e.g., denoted by FACTORY in FIG. 13), and a local offset LOFS of the display panel 510, which is calculated based on a characteristic difference between the pixel blocks PBL in the manufacturing stage of the display panel 510. The reference current-temperature model MOD may be a linear model having an inclination of a temperature with respect to a current. In some example embodiments, the reference current-temperature model MOD may be a piecewise linear model in which the inclination of the temperature with respect to the current varies for each section.

In an ideal case, when the same temperature sensing voltage TSV is applied to the pixels P included in the same product, in other words, the same display panel 510 at the same temperature, all of the sensing currents SC flowing through the pixels P should be equal to each other. However, since a characteristic deviation exists between the pixels P included in one display panel 510 due to various aspects of a manufacturing process, even when the same temperature sensing voltage TSV is applied to the pixels P included in the display panel 510 at the same temperature, the sensing currents SC flowing through the pixels P may not be equal to each other. In other words, even when the same temperature sensing voltage TSV is applied to the pixel blocks PBL included in the display panel 510 at the same temperature, sensing current averages ASC flowing through the pixel blocks PBL may not be equal to each other. In addition, since a characteristic deviation exists even between the same display panels 510 (e.g., the same products) due to various aspects of the manufacturing process, even when the same temperature sensing voltage TSV is applied to the same display panels 510 at the same temperature, the sensing currents SC flowing through the display panels 510 may not be equal to each other.

For this reason, the memory device 530 may store a representative model that is set for the display panel 510 by a manufacturer, in other words, the reference current-temperature model MOD, and may store the global offset GOFS and the local offset LOFS of the display panel 510 when the global offset GOFS for removing the characteristic deviation existing between the display panels 510 in the manufacturing stage of the display panel 510 and the local offset LOFS for removing the characteristic deviation between the pixel blocks PBL within the display panel 510 are calculated (e.g., denoted by OFFSET CALCULATION in FIG. 13). Accordingly, the display device 500 may predict temperatures BTEMP of the pixel blocks PBL (e.g., a panel temperature of the display panel 510) by measuring the sensing currents SC flowing through the pixels P as the temperature sensing voltage TSV is applied to the pixels P when the display panel 510 operates, calculating averages of the sensing currents SC for each pixel block (e.g., denoted by SC1 to SCm) to calculate the sensing current averages ASC of the pixel blocks PBL, applying the global offset GOFS and the local offset LOFS of the display panel 510 to the sensing current averages ASC to calculate correction sensing current averages CASC of the pixel blocks PBL, and substituting the correction sensing current averages CASC into the reference current-temperature model MOD. A method of calculating the global offset GOFS of the display panel 510 may be substantially the same as the method of calculating the global offset GOFS described with reference to FIGS. 6 and 7, and a method of calculating the local offset LOFS of the display panel 510 will be described below with reference to FIGS. 14 and 15.

The panel temperature determiner 540 may determine the temperatures BTEMP of the pixel blocks PBL in an operation stage of the display panel 510 (e.g., denoted by REAL-TIME in FIG. 13). For example, the panel temperature determiner 540 may measure the sensing currents SC flowing through the pixels P as the temperature sensing voltage TSV is applied to the pixels P, calculate the sensing current averages ASC of the pixel blocks PBL, each of which includes a plurality of pixels P, calculate the correction sensing current averages CASC by applying the global offset GOFS and the local offset LOFS of the display panel 510 to the sensing current averages ASC, and determine the temperatures BTEMP of the pixel blocks PBL by substituting the correction sensing current averages CASC into the representative model that is set for the display panel 510 by the manufacturer, in other words, the reference current-temperature model MOD. In other words, as shown in FIG. 13, the sensing currents SC1 to SCm flowing through the pixels P included in the pixel block PBL as the temperature sensing voltage TSV is applied to the pixel block PBL may be measured, the average of the sensing currents SC1 to SCm, in other words, the sensing current averages ASC may be calculated (e.g., denoted by AVERAGE in FIG. 13), the characteristic deviation existing between the display panels 510 may be removed as the global offset GOFS of the display panel 510 including the pixel block PBL is applied to the sensing current average ASC, and the characteristic deviation between the pixel blocks PBL within the display panel 510 including the pixel block PBL may be removed as the local offset LOFS of the display panel 510 including the pixel block PBL is applied to the sensing current average ASC. In this case, the temperature BTEMP of the pixel block PBL may be accurately derived when the correction sensing current average CASC obtained by applying the global offset GOFS and the local offset LOFS of the display panel 510 to the sensing current average ASC of the pixel block PBL is substituted into the reference current-temperature model MOD (e.g., denoted by LUT in FIG. 13).

The temperature afterimage compensator 550 may perform the temperature afterimage compensation on image data IMG that is to be applied to the pixel blocks PBL based on the temperatures BTEMP of the pixel blocks PBL. For example, the temperature afterimage compensator 550 may receive the image data IMG that is to be applied to the pixel blocks PBL (specifically, the image data IMG that is to be applied to the pixels P included in each of the pixel blocks PBL) from an external component (e.g., a graphic processing unit, etc.), receive the temperatures BTEMP of the pixel blocks PBL from the panel temperature determiner 540, compensate the image data IMG based on the temperatures BTEMP of the pixel blocks PBL to generate compensated image data CIMG, and provide the compensated image data CIMG to the display panel driver 520. Thereafter, the data driver included in the display panel driver 520 may convert the compensated image data CIMG into the data signal DS (e.g., the data voltage) and provide the data signals DS obtained through the conversion to the pixel blocks PBL (specifically, provide the data signal DS to the pixels P included in each of the pixel blocks PBL).

As described above, the display device 500 may include the display panel 510 including pixels P grouped into pixel blocks PBL, the display panel driver 520 configured to drive the display panel 510, the memory device 530 configured to store the reference current-temperature model MOD that is set for the display panel 510, the global offset GOFS of the display panel 510, which is calculated based on the reference current-temperature model MOD in a manufacturing stage of the display panel 510, and the local offset LOFS of the display panel 510, which is calculated based on a characteristic difference between the pixel blocks PBL in the manufacturing stage of the display panel 510, and the panel temperature determiner 540 configured to measure sensing currents SC flowing through the pixels P as a temperature sensing voltage TSV is applied to the pixels P, calculate sensing current averages ASC of the pixel blocks PBL, calculate correction sensing current averages CASC by applying the global offset GOFS and the local offset LOFS of the display panel 510 to the sensing current averages ASC of the pixel blocks PBL, and determine temperatures BTEMP of the pixel blocks PBL by substituting the correction sensing current averages CASC into the reference current-temperature model MOD. Accordingly, the display device 500 may not contain a temperature sensor so such that it can be manufactured in a low cost and in a small size, and may reflect all of a characteristic deviation between display panels 510, a characteristic deviation between pixels P within the display panel 510, and an external environment temperature at which the display panel 510 operates such that it can accurately identify the temperature BTEMP of the pixel blocks PBL. Therefore, temperature afterimage compensation may be accurately performed on image data IMG that is to be applied to the pixel blocks PBL through the temperature afterimage compensator 550. Although the display panel driver 520 has been shown in FIG. 11 as having a configuration that is provided separately from the panel temperature determiner 540 and the temperature afterimage compensator 550, in some example embodiments, at least two of the display panel driver 520, the panel temperature determiner 540, and the temperature afterimage compensator 550 may be implemented as one configuration.

Figure 14:
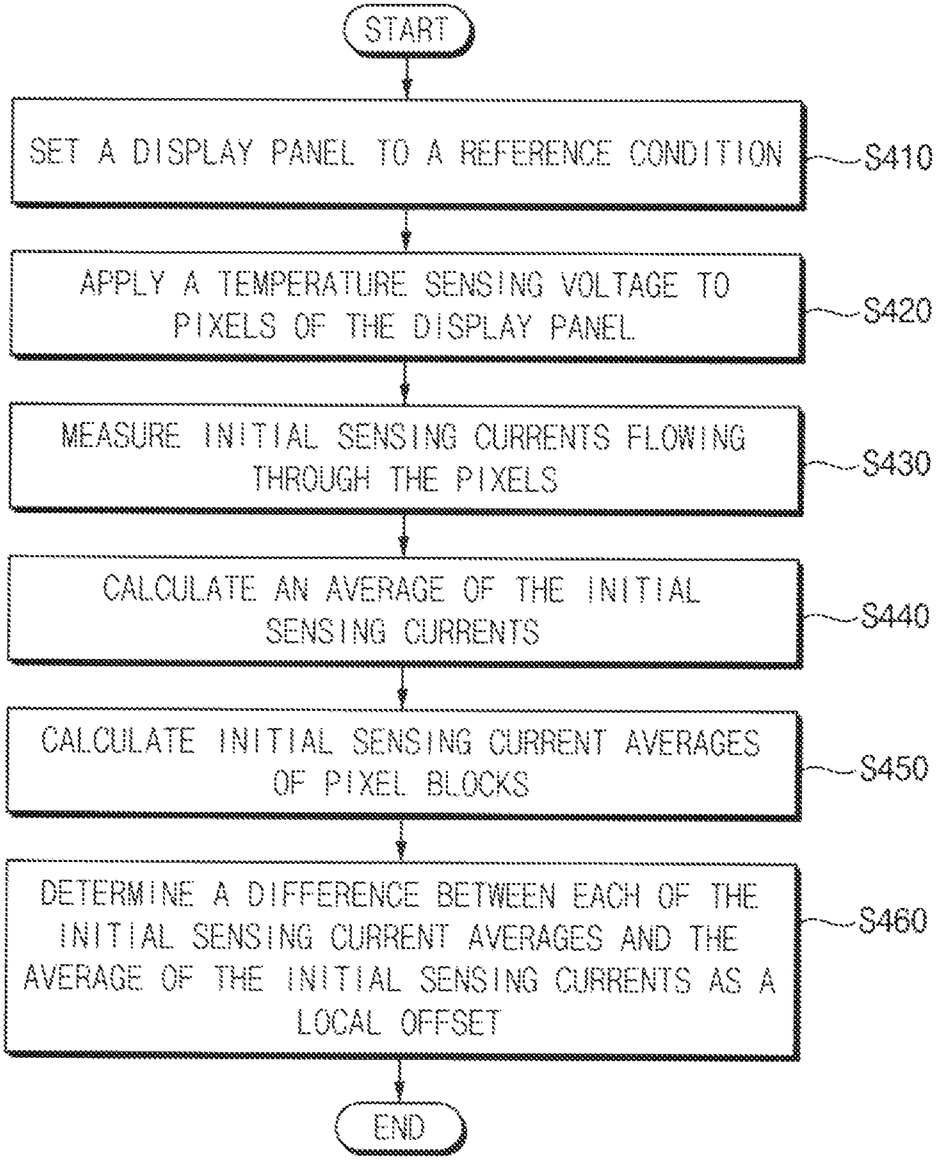
FIG. 14 is a flowchart illustrating a calculation of a local offset stored in a memory device included in the display device of FIG. 11.
Figure 15:
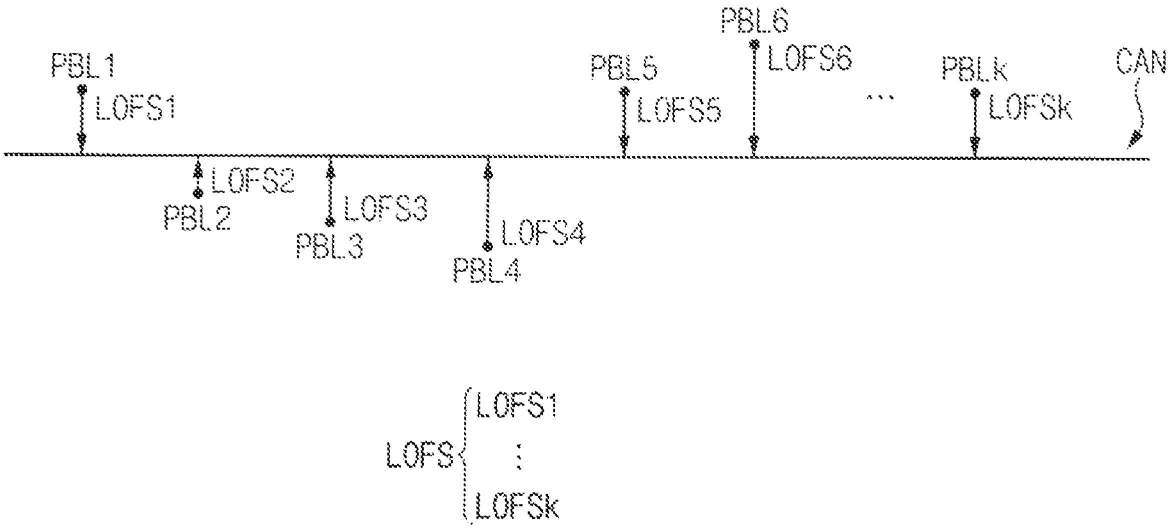
FIG. 15 is a diagram for describing a calculation of a local offset stored in a memory device included in the display device of FIG. 11.

FIG. 14 is a flowchart illustrating a calculation of a local offset stored in a memory device included in the display device of FIG. 11, and FIG. 15 is a diagram for describing a calculation of a local offset stored in a memory device included in the display device of FIG. 11.

Referring to FIGS. 14 and 15, a local offset calculation method of FIG. 14 may include setting a display panel 510 to a reference condition (S410), applying a temperature sensing voltage TSV to pixels P of the display panel 510 (S420), measuring initial sensing currents flowing through the pixels P of the display panel 510 (S430), calculating an average I of the initial sensing currents (S440), calculating initial sensing current averages ASC of pixel blocks PBL (S450), and determining a difference between each of the initial sensing current averages ASC of the pixel blocks PBL and the average I of the initial sensing currents as a local offset LOFS of the display panel 510 (S460).

For example, the local offset calculation method of FIG. 14 may include setting the display panel 510 to the reference condition (S410). In other words, the local offset LOFS of the display panel 510 may be used to remove a characteristic deviation existing between the pixel blocks PBL included in one display panel 510 due to various causes in a manufacturing process, so that the display panel 510 may be set to the reference condition to put the pixel blocks PBL under the same condition. For example, in the local offset calculation method of FIG. 14, the display panel 510 may be set to the reference condition by applying a black display gray level to the display panel 510.

Thereafter, the local offset calculation method of FIG. 14 may include applying the temperature sensing voltage TSV to the pixels P of the display panel 510 (S420), and measuring the initial sensing currents flowing through the pixels P of the display panel 510 (S430). Since a sensing current measurement operation for measuring sensing currents SC flowing through the pixels P is performed during a vertical blank period of one frame during a display operation of the display panel 510, a sensing current measurement operation for all of the pixels P included in the display panel 510 may be completed over n frames. However, since a sensing current measurement operation for measuring the initial sensing currents flowing through the pixels P is performed without any specific time constraint in a manufacturing stage of the display panel 510, the sensing current measurement operation for all the pixels P included in the display panel 510 may be performed at once during a preset time.

Next, when the initial sensing currents flowing through all of the pixels P included in the display panel 510 are measured, the local offset calculation method of FIG. 14 may include calculating the average I of the initial sensing currents (S440). For example, FIG. 15 shows a situation where the local offset LOFS of the display panel 510 is determined. In FIG. 15, the average I of the initial sensing currents flowing through all of the pixels P included in the display panel 510 has been shown as CAN.

Thereafter, the local offset calculation method of FIG. 14 may include calculating the initial sensing current averages ASC of the pixel blocks PBL (S450). For example, when assuming that one pixel block PBL includes m pixels P, the initial sensing current average ASC of the pixel block PBL may be an average of m initial sensing currents flowing through the m pixels P included in the pixel block PBL.

Next, the local offset calculation method of FIG. 14 may include determining the difference between each of the initial sensing current averages ASC of the pixel blocks PBL and the average I of the initial sensing currents as the local offset LOFS of the display panel 510 (S460). For example, as shown in FIG. 15, in determining the local offset LOFS of the display panel 510, LOFS1 corresponding to a difference between an initial sensing current average ASC of a first pixel block PBL1 and the average I of the initial sensing currents (e.g., denoted by CAN) may be determined as a local offset LOFS for the first pixel block PBL1, LOFS2 corresponding to a difference between an initial sensing current average ASC of a second pixel block PBL2 and the average I of the initial sensing currents (e.g., denoted by CAN) may be determined as a local offset LOFS for the second pixel block PBL2, LOFS3 corresponding to a difference between an initial sensing current average ASC of a third pixel block PBL3 and the average I of the initial sensing currents (e.g., denoted by CAN) may be determined as a local offset LOFS for the third pixel block PBL3, and LOFSk corresponding to a difference between an initial sensing current average ASC of a $k^{th}$ pixel block PBLk and the average I of the initial sensing currents (e.g., denoted by CAN) may be determined as a local offset LOFS for the $k^{th}$ pixel block PBLk.

Figure 16:
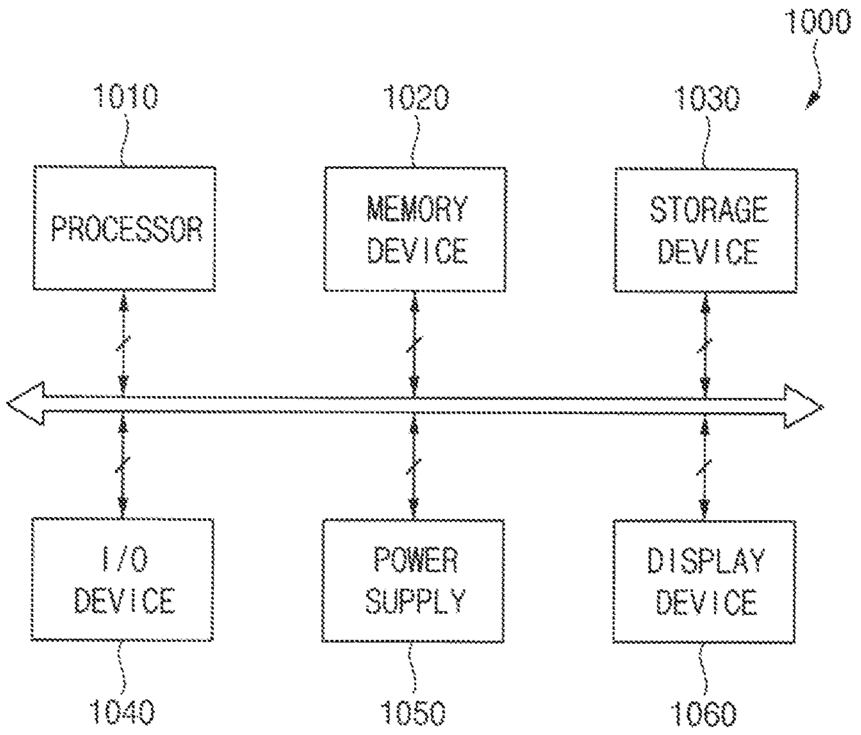
FIG. 16 is a block diagram illustrating an electronic device according to example embodiments of the present disclosure.
Figure 17:
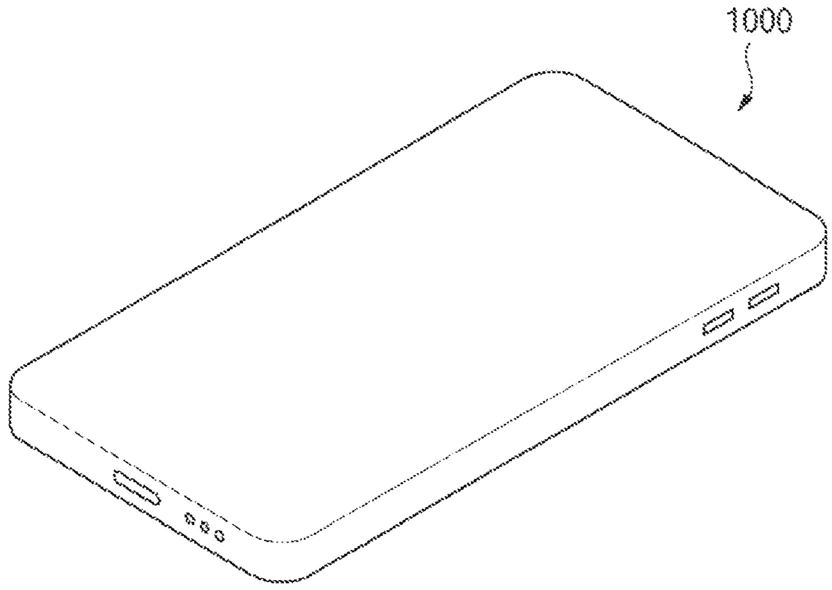
FIG. 17 is a diagram illustrating an example in which the electronic device of FIG. 16 is implemented as a smart phone.

FIG. 16 is a block diagram illustrating an electronic device according to example embodiments of the present disclosure, and FIG. 17 is a diagram illustrating an example in which the electronic device of FIG. 16 is implemented as a smart phone.

Referring to FIGS. 16 and 17, the electronic device 1000 may include a processor 1010, a memory device 1020, a storage device 1030, an input/output (I/O) device 1040, a power supply 1050, and a display device 1060. Here, the display device 1060 may be the display device 100 of FIG. 1 or the display device 500 of FIG. 11. In addition, the electronic device 1000 may further include a plurality of ports for communicating with a video card, a sound card, a memory card, a universal serial bus (USB) device, other electronic devices, etc. In an example embodiment, as illustrated in FIG. 17, the electronic device 1000 may be implemented as a smart phone. However, the electronic device 1000 is not limited thereto. For example, the electronic device 1000 may be implemented as a cellular phone, a video phone, a smart pad, a smart watch, a tablet PC, a car navigation system, a computer monitor, a laptop, a head mounted display (HMD) device, etc.

The processor 1010 may perform various computing functions. The processor 1010 may be a micro processor, a central processing unit (CPU), an application processor (AP), etc. The processor 1010 may be coupled to other components via an address bus, a control bus, a data bus, etc. Further, the processor 1010 may be coupled to an extended bus such as a peripheral component interconnection (PCI) bus.

The memory device 1020 may store data for operations of the electronic device 1000. For example, the memory device 1020 may include at least one non-volatile memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, etc and/or at least one volatile memory device such as a dynamic random access memory (DRAM) device, a static random access memory (SRAM) device, a mobile DRAM device, etc.

The storage device 1030 may include a solid state drive (SSD) device, a hard disk drive (HDD) device, a compact disc-read only memory (CD-ROM) device, etc.

The I/O device 1040 may include an input device such as a keyboard, a keypad, a mouse device, a touch-pad, a touch-screen, etc, and an output device such as a printer, a speaker, etc. In some example embodiments, the I/O device 1040 may include the display device 1060.

The power supply 1050 may provide power for operations of the electronic device 1000. For example, the power supply 1050 may be a power management integrated circuit (PMIC).

The display device 1060 may display an image corresponding to visual information of the electronic device 1000. In an example embodiment, the display device 1060 may be an organic light emitting display device. The display device 1060 may be connected to other components through buses or other communication links. In this case, the display device 1060 may not include a temperature sensor so that it can be manufactured at a low cost and in a small size, and may reflect all of a characteristic deviation between display devices 1060 (e.g., the same products), a characteristic deviation between pixels within the display device 1060, and an external environment at which the display device 1060 operates so that it can accurately identify temperatures of the pixels (or temperatures of pixel blocks). Therefore, temperature afterimage compensation may be accurately performed on image data that is to be applied to the pixels (or the pixel blocks).

In an example embodiment, the display device 1060 may include a display panel including pixels, a display panel driver configured to drive the display panel, a memory device configured to store a reference current-temperature model that is set for the display panel, a global offset of the display panel, which is calculated based on the reference current-temperature model in a manufacturing stage of the display panel, and a local offset of the display panel, which is calculated based on a characteristic difference between the pixels in the manufacturing stage of the display panel, and a panel temperature determiner configured to measure sensing currents flowing through the pixels as a temperature sensing voltage is applied to the pixels, calculate correction sensing currents by applying the global offset and the local offset of the display panel to the sensing currents, and determine temperatures of the pixels by substituting the correction sensing currents into the reference current-temperature model. Since theses are described above with reference to FIGS. 1 to 10, duplicated description related thereto will not be repeated.

In another example embodiment, the display device 1060 may include a display panel including pixels grouped into pixel blocks, a display panel driver configured to drive the display panel, a memory device configured to store a reference current-temperature model that is set for the display panel, a global offset of the display panel, which is calculated based on the reference current-temperature model in a manufacturing stage of the display panel, and a local offset of the display panel, which is calculated based on a characteristic difference between the pixel blocks in the manufacturing stage of the display panel, and a panel temperature determiner configured to measure sensing currents flowing through the pixels as a temperature sensing voltage is applied to the pixels, calculate sensing current averages of the pixel blocks, calculate correction sensing current averages by applying the global offset and the local offset of the display panel to the sensing current averages of the pixel blocks, and determine temperatures of the pixel blocks by substituting the correction sensing current averages into the reference current-temperature model. Since theses are described above with reference to FIGS. 11 to 15, duplicated description related thereto will not be repeated.

The present disclosure may be applied to a display device and an electronic device including the display device. For example, the present disclosure may be applied to a smart phone, a cellular phone, a video phone, a smart pad, a smart watch, a tablet PC, a car navigation system, a television, a computer monitor, a laptop, a head mounted display device, an MP3 player, etc.

The foregoing is illustrative of example embodiments of the present disclosure and is not to be construed as limiting thereof. Although a few example embodiments have been described, those skilled in the art will readily appreciate that many modifications are possible in the example embodiments without departing from the scope of the present disclosure. Accordingly, all such modifications are intended to be included within the scope of the present disclosure as set forth in the claims.

What is claimed is:

1. A display device, comprising:

a display panel including a plurality of pixels;

a display panel driver configured to drive the display panel;

a memory device configured to store a reference current-temperature model that is set for the display panel, a global offset of the display panel, which is calculated based on the reference current-temperature model in a manufacturing stage of the display panel, and a local offset of the display panel, which is calculated based on a characteristic difference between the pixels in the manufacturing stage; and a panel temperature determiner configured to measure sensing currents flowing through the pixels when a temperature sensing voltage is applied to the pixels, calculate correction sensing currents by applying the global offset and the local offset to the sensing currents, and determine temperatures of the pixels by substituting the correction sensing currents into the reference current-temperature model, wherein, in the manufacturing stage, an average temperature of the display panel is measured by a temperature sensing device, wherein, in the manufacturing stage, initial sensing currents flowing through the pixels when the temperature sensing voltage is applied to the pixels are measured an average of the initial sensing currents is calculated, and a difference between a current mapped to the average temperature in the reference current-temperature model and the average of the initial sensing currents is determined as the global offset.

2. The display device of claim 1, further comprising:

a temperature afterimage compensator configured to perform temperature afterimage compensation on image data that is to be applied to the pixels based on the temperatures of the pixels.

3. The display device of claim 1, wherein, in the manufacturing stage, initial sensing currents flowing through the pixels when the temperature sensing voltage is applied to the pixels are measured, an average of the initial sensing currents is calculated, and a difference between each of the initial sensing currents and the average of the initial sensing currents is determined as the local offset.

4. The display device of claim 1, wherein a frame in which the display panel operates includes an active period and a vertical blank period, and the panel temperature determiner performs a sensing current measurement operation of measuring the sensing currents during the vertical blank period.

5. The display device of claim 4, wherein the panel temperature determiner performs the sensing current measurement operation for one pixel row during the vertical blank period.

6. The display device of claim 4, wherein the panel temperature determiner does not perform the sensing current measurement operation during the vertical blank period in a preset low gray level frame.

7. The display device of claim 6, wherein the panel temperature determiner determines the frame as the preset low gray level frame when iaxi mum gray level of image data of the frame is less than a reference gray level, determines the frame as the preset low gray level frame when a minimum gray level of the image data of the frame is less than the reference gray level, or determines the frame as the preset low gray level frame when an average gray level of the image data of the frame is less than the reference gray level.

8. The display device of claim 4, wherein the panel temperature determiner performs a panel temperature determination operation of determining the temperatures of the pixels after the sensing current measurement operation for all of the pixels is completed.

9. A display device, comprising:
a display panel including a plurality of pixels, which are grouped into pixel blocks;
a display panel driver configured to drive the display panel;
a memory device configured to store a reference current-temperature model that is set for the display panel, a global offset of the display panel, which is calculated based on the reference current-temperature model in a manufacturing stage of the display panel, and a local offset of the display panel, which is calculated based on a characteristic difference between the pixel blocks in the manufacturing stage; and
a panel temperature determiner configured to measure sensing currents flowing through the pixels when a temperature sensing voltage is applied to the pixels, calculate sensing current averages of the pixel blocks, calculate correction sensing current averages by applying the global offset and the local offset to the sensing current averages, and determine temperatures of the pixel blocks by substituting the correction sensing current averages into the reference current-temperature model,
wherein, in the manufacturing stage, an average temperature of the display panel is measured by a temperature sensing device,
wherein, in the manufacturing stage, initial sensing currents flowing through the pixels when the temperature sensing voltage is applied to the pixels are measured an average of the initial sensing currents is calculated, and a difference between a current mapped to the average temperature in the reference current-temperature model and the average of the initial sensing currents is determined as the global offset.

10. The display device of claim 9, further comprising:
a temperature afterimage compensator configured to perform temperature afterimage compensation on image data that is to be applied to the pixel blocks based on the temperatures of the pixel blocks.

11. The display device of claim 9, wherein, in the manufacturing stage, initial sensing currents flowing through the pixels when the temperature sensing voltage is applied to the pixels are measured, an average of the initial sensing currents is calculated, initial sensing current averages of the pixel blocks are calculated, and a difference between each of the initial sensing current averages of the pixel blocks and the average of the initial sensing currents is determined as the local offset.

12. The display device of claim 9, wherein a frame in which the display panel operates includes an active period and a vertical blank period, and the panel temperature determiner performs a sensing current measurement operation of measuring the sensing currents during the vertical blank period.

13. The display device of claim 12, wherein the panel temperature determiner performs the sensing current measurement operation for one pixel row during the vertical blank period.

14. The display device of claim 12, wherein the panel temperature determiner does not perform the sensing current measurement operation during the vertical blank period in a preset low gray level frame.

15. The display device of claim 14, wherein the panel temperature determiner determines the frame as the preset low gray level frame when a maximum gray level of image data of the frame is less than a reference gray level, determines the frame as the preset low gray level frame when a minimum gray level of the image data of the frame is less than the reference gray level, or determines the frame as the preset low gray level frame when an average gray level of the image data of the frame is less than the reference gray level.

16. The display device of claim 12, wherein the panel temperature determiner performs a panel temperature determination operation of determining the temperatures of the pixel blocks after the sensing current measurement operation for all of the pixels is completed.

17. A display device, comprising:
a display panel including a plurality of pixels;
a display panel driver configured to drive the display panel;
a memory device configured to store a reference current-temperature model that is set for the display panel, a global offset of the display panel, which is calculated based on the reference current-temperature model, and a local offset of the display panel, which is calculated based on a characteristic difference between the pixels; and
a panel temperature determiner configured to measure sensing currents flowing through the pixels when a temperature sensing voltage is applied to the pixels, calculate correction sensing currents by applying the global offset and the local offset to the sensing currents, and determine temperatures of the pixels by adjusting the reference current-temperature model with the correction sensing currents,
wherein the global offset corresponds to a difference between a current mapped to an average temperature in the reference current-temperature model and an average of initial sensing currents flowing through the pixels when the temperature sensing voltage is applied to the pixels.

* * * * *